United States Patent

Shiobara

[11] Patent Number: 6,088,363
[45] Date of Patent: Jul. 11, 2000

[54] NETWORK SYSTEM TRANSMISSION CONTROL METHOD

[75] Inventor: Yasuhisa Shiobara, Tokyo, Japan

[73] Assignee: Kabushiki Kaisha Toshiba, Kawasaki, Japan

[21] Appl. No.: 08/984,952

[22] Filed: Dec. 4, 1997

[30] Foreign Application Priority Data

Dec. 4, 1996 [JP] Japan .................................. 8-323650

[51] Int. Cl.[7] .................................................. H04L 12/44
[52] U.S. Cl. .......................... 370/461; 370/471; 709/213; 709/225
[58] Field of Search .................................... 370/389, 400, 370/407, 425, 442, 461, 462, 471; 709/213, 225

[56] References Cited

U.S. PATENT DOCUMENTS

| 4,412,326 | 10/1983 | Limb ........................................ 370/448 |
| 4,814,761 | 3/1989 | Takahashi et al. .................. 340/825.05 |
| 5,210,753 | 5/1993 | Natarajan . |
| 5,535,214 | 7/1996 | Shiobara ................................. 370/455 |
| 5,727,149 | 3/1998 | Hirata et al. ......................... 395/200.8 |
| 5,734,830 | 3/1998 | Balogh et al. ........................ 395/200.8 |
| 5,751,963 | 5/1998 | Umetsu .................................... 709/223 |
| 5,757,901 | 5/1998 | Hiroshige ................................ 379/212 |
| 5,838,687 | 11/1998 | Ramfelt .................................... 370/443 |

*Primary Examiner*—Hassan Kizou
*Assistant Examiner*—Ahmed Elallam
*Attorney, Agent, or Firm*—Oblon, Spivak, McClelland, Maier & Neustadt, P.C.

[57] ABSTRACT

To improve the method of scheduling data transfer requests based on the transfer completion times to the transfer addresses which are assigned to the data for which transfers are requested. A limit time is assigned as an attribute to the data for which transfer is requested from control system 1. The transmission station which becomes the data station (transmission control processing circuit 12) produces a transfer completion time, taking the limit time as the upper digit, the count value of counter 13 which counts a constant clock as the middle digit and the number inherent to the transmission station as the lower digit, and transfers to the transmission station, which becomes the master station, output request control information which includes the data packet length found from this transfer completion time and the data length to be transferred. The transmission station, which becomes the master station, (transmission control processing circuit 12 and reception control processing circuit 17) determines the order given to output permissions based on the transfer completion times, determines the number of output requests permitted based on the data packet lengths, and schedules output permissions for the output requests of multiple transmission stations.

24 Claims, 19 Drawing Sheets

BUS TYPE NETWORK SYSTEM

STAR TYPE NETWORK SYSTEM

OUTPUT REQUEST INFORMATION (RQCW)

| |
|---|
| CHAIN AREA 1 |
| TRANSFER DATA STORAGE LEAD ADDRESS |
| TRANSFER ADDRESS INFORMATION |
| TRANSFER DATA PRIORITY DISCRIMINATOR Pri |
| TRANSFER COMPLETION LIMIT TIME Tw |
| TRANSFER DATA LENGTH DtLen |
| EMPTY AREA |

*Fig. 11*

OUTPUT REQUEST QUEUE CONTROL LANGUAGE

| |
|---|
| MEMORY ADDRESS OF CHAIN AREA OF OUTPUT REQUEST CONTROL INFORMATION OF LEAD (Top-PTR) |
| MEMORY ADDRESS OF CHAIN AREA OF OUTPUT REQUEST CONTROL INFORMATION OF FINAL TAIL (Bottom-PTR) |
| COUNT NUMBER OF OUTPUT REQUEST CONTROL INFORMATION (RQcnt) |

*Fig. 13*

OUTPUT REQUEST CONTROL INFORMATION (TMCW)

| |
|---|
| CHAIN AREA |
| TRANSFER DATA PRIORITY DISCRIMINATOR Pri |
| TRANSFER COMPLETION TIME UPPER DIGIT Tw |
| TRANSFER COMPLETION TIME MIDDLE DIGIT Tcnt |
| TRANSFER COMPLETION TIME LOWER DIGIT STN |
| DATA PACKET LENGTH PtLen |
| DATA STATION NUMBER STno |
| RQCW POINTER |
| EMPTY AREA |

Fig. 12(a)

OUTPUT REQUEST CONTROL INFORMATION (TMCW)

| |
|---|
| CHAIN AREA |
| TRANSFER DATA PRIORITY DISCRIMINATOR Pri |
| SLOT LIMIT NUMBER Nm |
| SLOT WAITING NUMBER Nw |
| DATA PACKET LENGTH PtLen |
| DATA STATION NUMBER STno |
| RQCW POINTER |
| EMPTY AREA |

Fig. 12(b)

OUTPUT PERMISSION INFORMATION

TRANSFER OPTIMUM DATA OUTPUT PERMISSION INFORMATION

Fig.15(a)

EXAMPLE OF FORMAT OF OUTPUT REQUEST PACKET

| PREAMBLE | ADDRESSEE DATA STATION ADDRESS | OUTPUT ORIGINATOR DATA STATION ADDRESS | TRANSMISSION CONTROL DISCRIMINATOR CNT | OUTPUT REQUEST CONTROL INFORMATION TMCW | CRC CONTROL LANGUAGE |

Fig.15(b)

EXAMPLE OF FORMAT OF OUTPUT PERMISSION PACKET

| PREAMBLE | ADDRESSEE DATA STATION ADDRESS | OUTPUT ORIGINATOR DATA STATION ADDRESS | TRANSMISSION CONTROL DISCRIMINATOR CNT | OUTPUT PERMISSION INFORMATION | CRC CONTROL LANGUAGE |

Fig.15(c)

EXAMPLE OF FORMAT OF TRANSMISSION COMPLETION PACKET

| PREAMBLE | ADDRESSEE DATA STATION ADDRESS | OUTPUT ORIGINATOR DATA STATION ADDRESS | TRANSMISSION CONTROL DISCRIMINATOR CNT | OUTPUT COMPLETION INFORMATION | CRC CONTROL LANGUAGE |

Fig.15(d)

EXAMPLE OF FORMAT OF OUTPUT REQUEST ENQUIRY PACKET

| PREAMBLE | ADDRESSEE DATA STATION ADDRESS | OUTPUT ORIGINATOR DATA STATION ADDRESS | TRANSMISSION CONTROL DISCRIMINATOR CNT | CRC CONTROL LANGUAGE |

TABLE (TBL-1)

| REMAINING TIME (TRmain) | SCHEDULING POSSIBILITY (Pb) | MAXIMUM LENGTH (PtLen-Max2) |
|---|---|---|
| < T1 | 0 (NOT POSSIBLE) | 0 |
| T1 ≤, < T2 | 1 | PtLen - 1 |
| T2 ≤, < T3 | 1 | PtLen - 2 |
| T3 ≤, < T4 | 1 | PtLen - 3 |
| ⋮ | ⋮ | ⋮ |
| Tn ≤ | 1 | PtLen - N |

*Fig.16(a)*

TABLE (TBL-2)

| DATA STATION NUMBER (STno) | OUTPUT POSSIBLE MAXIMUM DATA LENGTH (PtLen-Max3) |
|---|---|
| 1 | PtLen - 1 |
| 2 | PtLen - 2 |
| ⋮ | ⋮ |
| N | PtLen - N |

*Fig.16(b)*

TABLE (TBL-3)

| DATA STATION NUMBER STno | RECEPTION PROCESSING TIME FORCAST T1 | SIGNAL TRANSMISSION TIME FORCAST T2 |
|---|---|---|
| 1 | T1 - 1 | T2 - 1 |
| 2 | T1 - 2 | T2 - 2 |
| ⋮ | ⋮ | ⋮ |
| N | T1 - N | T2 - N |

*Fig.16(c)*

| RECEPTION DATA STATION INFORMATION TABLE (TBL-4) | | |
|---|---|---|
| DATA STATION NUMBER STno | RECEIVED PACKET DISCRIMINATION INFORMATION RDId | RECEIVED PACKET NUMBER RDCnt |
| 1 | RDId - 1 | RDCnt - 1 |
| 2 | RDId - 2 | RDCnt - 2 |
| ⋮ | ⋮ | ⋮ |
| N | RDId - N | RDCnt - N |

OUTPUT REQUEST SEARCH LIST (TBL-5)

| SEARCH ORDER | DATA STATION NUMBER SN |
|---|---|
| 1 | SN - 1 |
| 2 | SN - 2 |
| ⋮ | ⋮ |
| N | SN - N |

NETWORK SYSTEM TRANSMISSION CONTROL METHOD

BACKGROUND OF THE INVENTION

1. Field of the Invention

This invention concerns a network system transmission control method by which multiple transmission stations mutually exchange data.

2. Description of the Related Art

Multiple control systems are positioned dispersed on the production lines of industrial facilities and the like, and network systems are used to exchange data so that various types of equipment are correlated and operate in cooperation. As control systems, there are such systems as programmable controllers which control various types of production machinery, measuring systems, I/O (input/output) systems, central operator operated monitoring systems which monitor the state of a line and execute operations, and control computers which execute production quality control and production result control, production program control, and the like. There are many configurations for network systems such as bus type, star type, ring type and also mesh type.

FIG. 20 shows a bus type network system as one example of this type of system. It is composed by connecting multiple transmission stations (STN #n) which execute control of data transfer mutually between control systems to a common transmission path (L).

Each control system (not shown in the drawing) is connected to any of the transmission stations. When the transmission and reception of data is executed by each control system, the control system generally executes a data transfer request by adding data attributes, such as transfer addressee and transmission originator information, information on the data to be transmitted and processing information by the transfer addressee, to the exchange data. The transmission station which receives the data transfer request collates the transfer data into data packets and executes an output request. The output requests from multiple transmission stations are scheduled, and, after permission to use the common transmission path has been obtained, the station outputs the data packets to the transmission path. The data packets which are outputted to the transmission path are received by the transfer addressee transmission station which is designated in the address. The exchanged data and the data attributes are delivered to the transfer addressee control system. Thus, it is possible for the control systems to exchange data with each other.

Also, with this type of network system, because of such factors as simplicity of design by apportioning of transmission zones, real-time capability and data recoverability, normally, in a constant transmission cycle, each control system broadcasts its respective input and output data to all the other control systems. Through each control system receiving and inputting this, the respective control systems hold the input and output data of the other control systems in common, and a transmission system is used which enables data exchange between the control systems merely by reading from and writing to a memory.

FIG. 20 shows the outline of this type of transmission system. It shows the data in an allocated area (D3) in the common memory (CM) of transmission station STN#3 being broadcast, and being inputted by other transmission stations and being stored in the respective areas (D3) of common memory (CM). By each transmission station executing the broadcast of data in the same way, each control system can easily execute exchange of data with other control systems via the common memory (CM).

With this type of network system, the total volume of data held in common by the network system as a whole, that is to say between the control systems, is refreshed every transmission cycle, regardless of whether or not there is any variation in the data content, by mutual broadcast exchanges in constant transmission cycles. In other words, forming a virtual common memory in the network and taking transmission cycles as units, makes it easier to design good definition of the working times and the necessary transmission zones for data exchange. Recovery from the dropping of transitory data due to refreshing every transmission cycle also becomes possible. Also, it enables co-operative operation between various control systems based on status information for the whole of the control process which is developed in the virtual common memory.

In recent years, due to the rapid development of electronic technology and networking of its surrounding environment, there has been a tendency to make networking control systems more and more intelligent. As a result, the making of control systems practically autonomous and their dispersion have steadily developed, and their unitization can be considered. For communication between autonomous, dispersed control systems, it is considered that a network system with an infrastructure which can support a high degree of mutual co-operation is required.

The above network system makes possible simple communication between application processes via a common memory. However, conversely, the amount of data which can be exchanged between application processes via a common memory is limited by the balance between the time intervals which refresh the capacity of the common memory and the transfer speed which can be achieved at an appropriate cost.

In communications between unitized control systems as network applications hereafter, for example in the case of multimedia information such as images and voice being exchanged with the same degree of importance as control information, that is to say the communications data amount in response to an event which occurs unexpectedly, will vary dynamically depending on the state of the plant. Moreover, in the case of its being necessary to satisfy the required time restraints on control monitoring, with methods which take as prerequisites fixed data volumes and assignments as do the present network system methods, it is difficult to satisfy these fluctuating data communication requirements.

However, this does not mean that either a set-up which acts in cooperation by the control systems which are executed by present network systems holding in common the fixed input/output data which they mainly handle, that is to say by holding in common control state information, or a set-up which acts in cooperation by exchanging and holding in common event information, which corresponds to events, between respective application processes which are functional units and act autonomously is required. Their ratio will alter depending on the application. It is considered that a network system will become necessary which can support in a consistent form the data communications which both set-ups make necessary. In this case, as can be seen in present network systems, it is difficult to handle both functions with consistency in systems which take the method of fixed apportionment of transmission zones as a basis.

Also, with prior art network systems, in the case of a control system attempting data communication in response to an event which occurs unexpectedly, there is the problem that the output of data packets to the network system is not always at the expected time, and outputted data packets are not necessarily transferred to the final intended address within the expected time, affected in the state of generation of data transmission requests from one moment to the next over the entire network.

The cause of this is that, in order for the applications process group in a network system to hold in common and make common use of resources which participate in the communications of a network while being mutually interrelated, when data packet transfer requests accumulate, the stagnation of waiting for the allocation of communications resources in the network system occurs.

Therefore, consideration has been given to attempts to allocate resources so that the data packet transfer requests requested by the application processes group do not exceed the processing capability possessed by the communications resources and accumulate, and to regulate the timing and sequence of the generation of data packet transfer requests so that they do not build up excessively.

For example, with ATM (Asynchronous Transfer Mode), the design is that when there is a request for data communication from a host, the data amount which can be outputted by the host per unit time is determined by negotiation. Also, in the case of a host contravening this and trying to pass an oversized cell into the network for example, stagnation of the network is prevented by discarding the oversized cell as a deviant cell. As a result, the design is to increase the utilization efficiency for the many host machines which are connected to the network.

However, with a system like ATM which controls stagnation by determining in advance the communications capacity which can be used by negotiation, and each host machine observing this, in other words a system which executes data transfer within a communications capability determined by negotiation, there is a requirement to execute the setting of negotiation rules by using mean values and peak values of communications volume. As a result, it becomes a fixed network system.

With data communication between control systems in the future, the generation of communications requests will become increasingly random, and it will be difficult to make a fixed system, in which the communications capability is determined in advance, respond efficiently. Also, in relation to advance stipulation so that the generation timings and sequence of data packet transfer requests do not excessively accumulate, because transfer requests are random due to the irregularity attendant upon the working state, it is difficult correctly to regulate and control that generation timing and sequence beforehand.

For instance, even if, by some means or other, this is once precisely regulated, in its actual application, application process groups will repeatedly actively participate in the network system and separate from it. Moreover, when new application processes are added, application processes which have hitherto been operating are adjusted or stopped, and the network is expanded or adjusted, the sequence will soon lose its meaning. That is to say, when considering the actual state, the regulation of the sequence of data packets exchanged by the application processes group is impossible in itself.

Therefore, as a concept for the unified handling of the above, the present invention considers it satisfactory if the data exchanged between application processes which work in cooperation is correctly delivered to the addressee within the limit time required by an application. Taking this limit time, that is to say, as a basis the data transfer completion time to the addressee application processes, the present inventors have proposed methods (Laid-Open Patent Heisei 6-6407, Laid-Open Patent Heisei 6-152604 and Laid-Open Patent Heisei 8-32623) for the execution of processing concerning data transfer by taking it that the shortest transfer completion time for a data transfer request generated within a network system is the most urgent.

SUMMARY OF THE INVENTION

An object of this invention is to provide a network system transmission control method in a network system, in which multiple data stations mutually exchange data, which will execute the processing concerned with data transfer based on the transfer completion time to the authorized transfer addressee for the data for which transfer is requested and, in particular, will improve the method of scheduling transfer requests.

In order to achieve the above object, the network system transmission control method of this invention is as follows.

A limit time is assigned as an attribute for data for which transfer has been requested;
  a transmission station which becomes a data station
    produces the transfer completion time by taking the said limit time as the upper digit, the count value of a counter which measures a specified clock as the middle digit, and the inherent number of the transmission station as the lower digit and
    transfers output request control information which includes the data packet length obtained from this transfer completion time and the data length to the transmission station which becomes the master station,
    and
  the transmission station which becomes the master station
    determines the order given to the output permission based on the transfer completion time;
    determines the number of output requests to which permission is given based on the data packet lengths and
    schedules output permission for the output requests of multiple transmission stations.

Moreover, a transfer data priority discriminator is assigned as an attribute to the data for which transfer is requested in order to distinguish whether it is transfer time guaranteed data or transfer optimum data and
  a transmission station which becomes a data station
    composes output request control information by including the transfer data priority discriminator and
    transfers the output request control information to the transmission station which becomes the master station every specified time interval (slot time),
    and
  the transmission station which becomes the master station
    schedules output permissions for output requests of transfer time guaranteed data and transfer optimum data every slot time.

Furthermore, the transmission which becomes the master
    station determines the line-up order of received output request control information based on the transfer completion time;
  monitors any remaining time which was allocated to the output of transfer time guaranteed data in the specified time interval as an asynchronous period;
  reads the transfer completion times and the data packet lengths of transfer optimum data from the output request control information in the case of the output of transfer optimum data within this asynchronous period being judged to be possible;

determines the order of granting output permission based on the transfer completion time and determines the number of output requests to which output permission is given based on the data packet lengths.

Moreover, a transmission station which becomes a data station determines the order of the output request control information based on the transfer completion times and transfers only the output request control information of the transfer time guaranteed data to the transmission station which becomes the master station;

the transmission station which becomes the master station monitors the remaining time allocated to the output of transfer time guaranteed data within the specified time interval as an asynchronous period;

determines the maximum possible data length for the output of transfer optimum data within this asynchronous time and outputs transfer optimum output permission information which includes this maximum data length; and a data station which receives the transfer optimum output permission information sequentially reads the data packet lengths from the output request control information of the transfer optimum data and outputs transfer optimum data in the range of the maximum data length or less.

Furthermore, the transmission station which becomes the master station reads a second maximum data length for the transfer addressee data station number from lists established in advance for every transmission station in the case of its being judged that the output of transfer optimum data is possible during the said asynchronous time and outputs transfer optimum data output permission information which includes the second maximum data length when this second maximum data length is less than the maximum data length, and a data station which receives the transfer optimum output permission information outputs transfer optimum data in the range of the second maximum data length or less and limits the data length of the transfer optimum data outputted to every transfer addressee transmission station.

Also, a transfer data priority discriminator, which distinguishes whether it is transfer time guaranteed data or transfer optimum data, is assigned as an attribute for data for which transfer has been requested;

a transmission station which becomes a data station composes the output request control information by including the transfer data priority discriminator;

seeks the slot waiting number and the slot limit number based on the limit time in the case of transfer time guaranteed data;

determines the order in which to line up the output request control information based on this slot waiting number and slot limit number and sequentially transfers to the master station the output request control information every specified time interval (slot time), and the transmission station which becomes the master station determines the order in which output permission is given based on the limit times;

determines the number of permitted output requests based on the data packet lengths and schedules every slot time.

Also, a transfer data priority discriminator is assigned as an attribute of data for which transfer has been requested in order to distinguish whether it is transfer time guaranteed data or transfer optimum data, and, when it is transfer time guaranteed data a transmission station which becomes a data station determines the slot waiting numbers and the slot limit numbers based on the limit times;

composes second output request control information which includes the slot waiting numbers and the slot limit numbers and the data packet lengths found from the data which is to be transferred; and transfers the second output request control information to the master station in the order which has been determined based on the slot waiting numbers and slot limit numbers every specified time interval (slot time)

and the transmission station which becomes the master station determines the order of giving output permission based on the said data packet lengths;

determines the number of permitted output requests based on the slot waiting numbers and the slot limit numbers;

uses the slot waiting numbers and the slot limit numbers instead of the transfer completion times and schedules every slot time.

Also, a transfer data discriminator is assigned as an attribute to the data for which transfer is requested in order to distinguish whether it is transfer time guaranteed data or transfer optimum data and, in the case of transfer time guaranteed data, a transmission station which becomes a data station determines the slot waiting numbers and the slot limit numbers based on the limit times;

composes second output request control information which includes the data packet lengths found from the transfer data discriminators, the slot waiting numbers, the slot limit numbers and the data lengths to be transferred and transfers the second output request control information to the master station in an order determined based on the slot waiting numbers and the slot limit numbers every specified time interval (slot time);

and the transmission station which becomes the master station determines the order of giving output permission based on the slot waiting numbers and the slot limit numbers;

determines the number of permitted output requests based on the data packet lengths and a previously established extended output possible maximum data length and permits output in excess of the slot time frame in the case of a build-up of output requests for urgent transfer time guaranteed data.

Also, a transmission station which becomes a data station executes output requests for data packets every specified time interval;

the transmission station which becomes the master station gives output permission by executing scheduling for the output requests every specified time interval and, in the case of multiple transmission stations mutually exchanging data, a transmission station which becomes a data station
complies a received packet information list by up-dating the packet discrimination information and received packet numbers for every output originator data station whenever it receives a data packet from a data station which has obtained output permission;

transfers the contents of the received packets information list to the master station and all the other data stations when executing output requests for data packets every specified time interval regardless of whether or not there is an output data packet and enables judgement of whether or not an outputted data packet has been received by the transfer addressee data station.

Also, the transmission station which becomes the master station
provides within the specified time, a synchronous period to cause the execution of the output of transfer time guaranteed data, a reception period in which output requests for transfer time guaranteed data are received, and an asynchronous period made up of the remaining time after the synchronous period and the reception period have been subtracted from the specified time;

causes the output of transfer time guaranteed data from the data station in the specified time by outputting output permission information for the transfer time guaranteed data based on the output request control information received up to that point;

causes the output of output request control information from the data station in the reception period by outputting enquiry packets which urge output requests for transfer time guaranteed data;

causes the output of output request control information from the data station by outputting enquiry packets which urge output requests for transfer optimum data sequentially to the data stations in an output request search list, which has been established beforehand, in the case of the output of transfer optimum data being judged possible within the asynchronous period causes the output of transfer optimum data from the data station by outputting output permission information for transfer optimum data; and schedules output permission to output requests for transfer time guaranteed data and transfer optimum data every slot time for multiple transmission stations using a bus type network.

Also, a transmission station which becomes the master station and multiple transmission stations which become data stations are connected by star-type transmission paths in which full duplex communication is possible and the master station
has, within the specified time, a synchronous period in which it causes the execution of the output of transfer time guaranteed data, an asynchronous period formed by the remaining time when the synchronous period is subtracted from the specified period, and a reception period in which it receives output requests for transfer time guaranteed data and transfer optimum data by operating the synchronous period and the asynchronous period in parallel;

causes the output of transfer time guaranteed data from data stations by outputting output permission information for transfer time guaranteed data in the synchronous period;

causes the output of transfer optimum data from data stations by outputting output permission information for transfer optimum data in the case of the output of transfer optimum data being judged possible in the asynchronous period and schedules output permissions for the transfer time guaranteed data and transfer optimum data output requests of multiplied transmission stations, every slot time, using the star-type network, Moreover, a transmission station which becomes a data station
seeks float time (Taf) by subtracting current time and the transfer minimum time (Trq), which has been determined beforehand for every transfer addressee data station, from the limit time;

seeks the slot limit number (Nm) by dividing the float time (Taf) by the slot time (Ts);

seeks the trial possible number (Ntr) by dividing the float time (Taf) by the transfer minimum time (Trq);

seeks a trial subtrahend (Nr) based on the function (f (Ntr, STNo, K (constant))) established beforehand for every transfer addressee data station (STNo) and seeks the slot waiting number (Nw) by multiplying the transfer minimum time (Trq) by the trial subtrahend (Nr) and then dividing by the slot time (Ts).

Furthermore, a transmission station which becomes a data station reads the transfer addressee data station reception processing time forecast value (T1) and signal transfer time forecast value as far as the transfer addressee (T2) based on the transfer addressee data station number (STNo) assigned to the data for which transfer is requested from the list (TBL-1) prepared beforehand for every transfer addressee data station number;

reads the processing time forecast value (T3) required by the pre-established scheduling;

computes data packet delay time (T4) as far as the reception of the data packet by the transfer addressee data station based on the data packet length to be transferred and determines the transfer minimum time (Trq) by adding together T1, T2, T3 and T4.

Moreover, a transmission station which becomes a data station subtracts 1 from the slot waiting number and the slot limit number which were added to the transfer request control information of an output which is not complete every specified time interval;

arranges the transfer request control information in an order determined based on the slot waiting numbers and slot limit numbers every time a transfer is requested and transfers to the master station transfer request control information for which the slot waiting number becomes 0 or less.

BRIEF DESCRIPTION OF THE DRAWINGS

FIG. 2(*a*) is a bus type network system. FIG. 2(*b*) is a star type network system.

FIG. 11 is an example of the format of transfer request information (RQCW).

FIG. 12(a) is an example of the format of output request control information (TMCW) in which transfer completion time (Tcmp) is used. FIG. 12(b) is an example of the format of output request control information (TMCW) in which slot waiting number (Nw) and slot limit number (Nm) are used.

FIG. 13 is an example of the format of output request queue control language.

FIG. 15(a) is an example of the format of an output request packet from a data station. FIG. 15(b) is an example of the format of an output permission packet from the master station. FIG. 15(c) is an example of the format of an output completion packet from a data station. FIG. 15(d) is an example of the format of an output request enquiry packet.

FIG. 16(a) is a transfer optimum data output judgement/output maximum data length table (TBL-1) used by the master station. FIG. 16(b) is a transfer optimum data output possible maximum data length for every data station table (TBL-2) used by the master station. FIG. 16(c) is a processing delay time for every data station table (TBL-3) used by data stations.

DETAILED DESCRIPTION OF THE PREFERRED EMBODIMENTS

Figure 1:
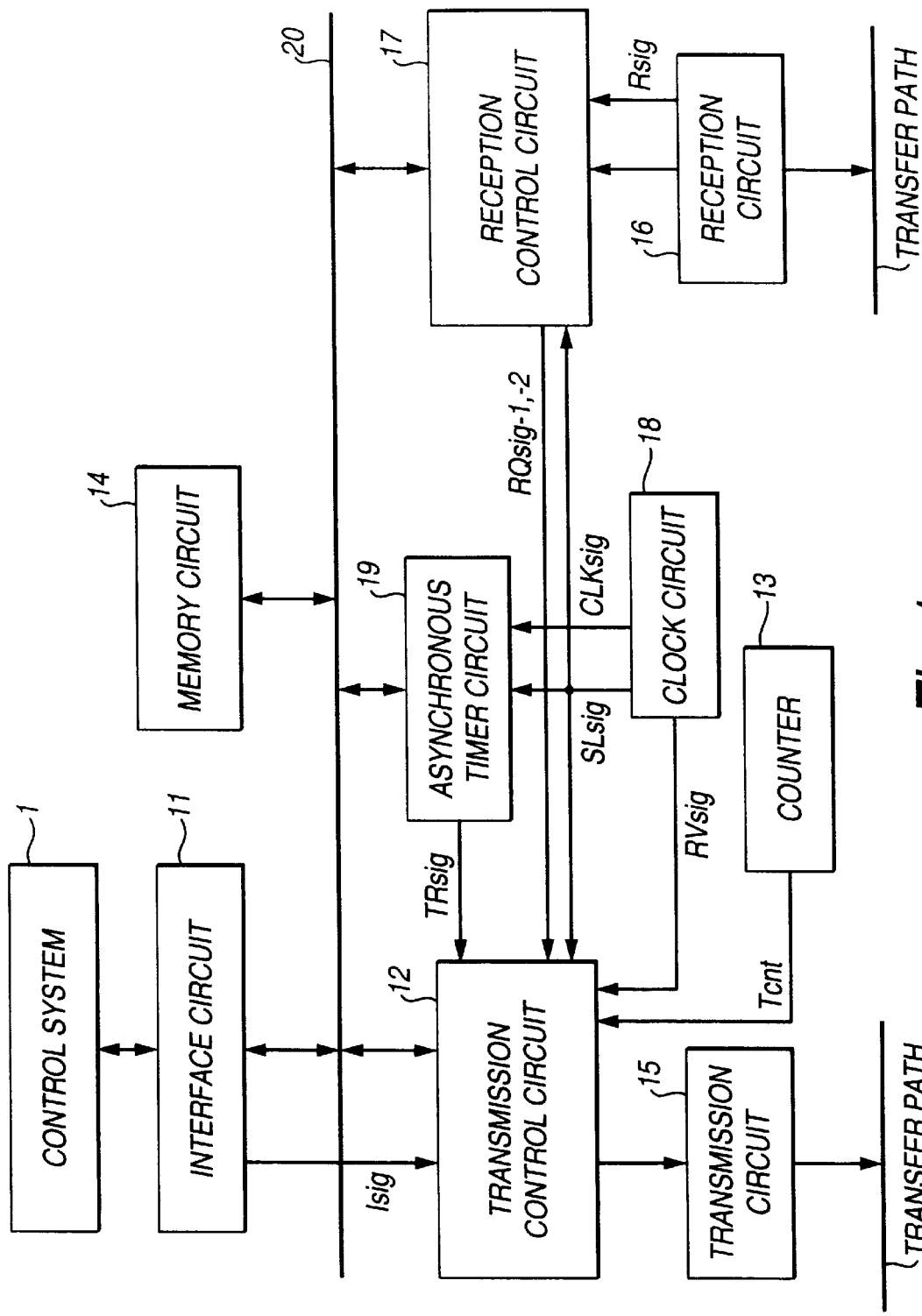
FIG. 1 is an embodiment of the hardware composition of a transmission station used with this invention.
Figure 2A:
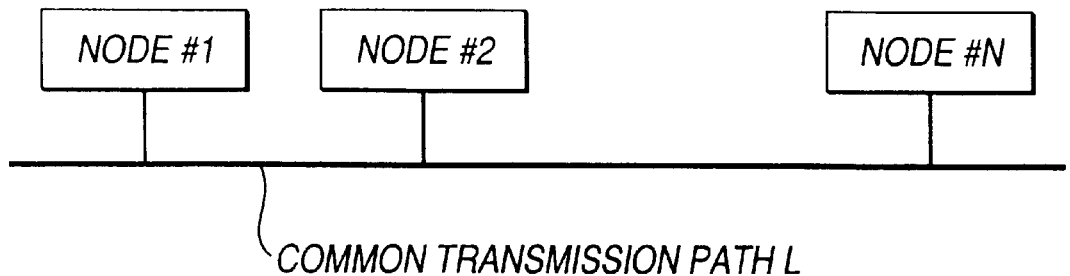
FIG. 2(*a*) and FIG. 2(*b*) are network systems to which this invention can be applied.
Figure 2B:
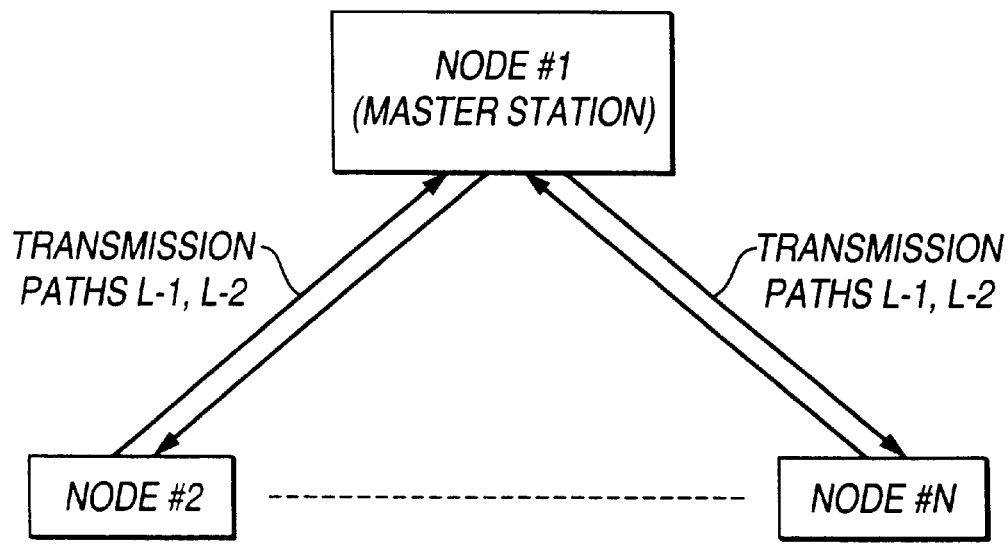

An example of the composition of a transmission station used in this invention is illustrated in FIG. 1, and examples of the composition of networks are illustrated in FIG. 2(a) and FIG. 2(b). The transmission station in FIG. 1 shows an example of the combined hardware composition for the data station and the master station which are mentioned below. Distinction between the hardware for the data station and the master station is not particularly required. FIG. 2(a) shows an example of a bus type network system. Each transmission station (Node #i) is connected to a common transmission path L. Any one of the transmission stations functions as the master station, while the other transmission stations function as data stations. Also, FIG. 2(b) shows an example of a star type network system. The transmission station (Node #1) which functions as the master station is positioned at the center of the star type transmission paths. Transmission paths which enable full duplex communication are connected between the other data stations (Node #2 . . . N).

This invention can be applied to either a bus type or a star type network system.

In FIG. 1, 1 is a control system as a local system which exercises various controls in the network system. When it executes the exchange of data between other control systems, it requests data transfer for the transmission station. The transmission station is composed by 11~20. 11 is an interface circuit; 12 is a transmission control processing circuit; 13 is a counter; 14 is a memory circuit; 15 is a transmission circuit; 16 is a reception circuit; 17 is a reception control processing circuit; 18 is a clock circuit; 19 is an asynchronous timer circuit and 20 is an internal system bus. Control system 1 is connected to the transmission station via interface circuit 11, and the reception of data is executed between it and memory circuit 14. The transmission path which connects reception circuit 15 and transmission circuit 16 is connected to combined transmission path L when the network is bus type, and when the network is star type they are connected to two separate transmission paths L1 and L2 which enable full duplex communication. The scheduling functions described below are provided for transmission control processing circuit 12 and reception control processing circuit 17 when functioning as the master station.

The following is a detailed description of a first embodiment of this invention.

In FIG. 1, when control system 1 requests a transfer of data, it writes transfer request information (RQCW) to memory circuit 14 via interface circuit 11. When transmission control processing circuit 12 receives a "writing completed" signal (Isig) from interface circuit 11, it produces output request control information (TMCW) and writes this to memory circuit 14.

Figure 3A:
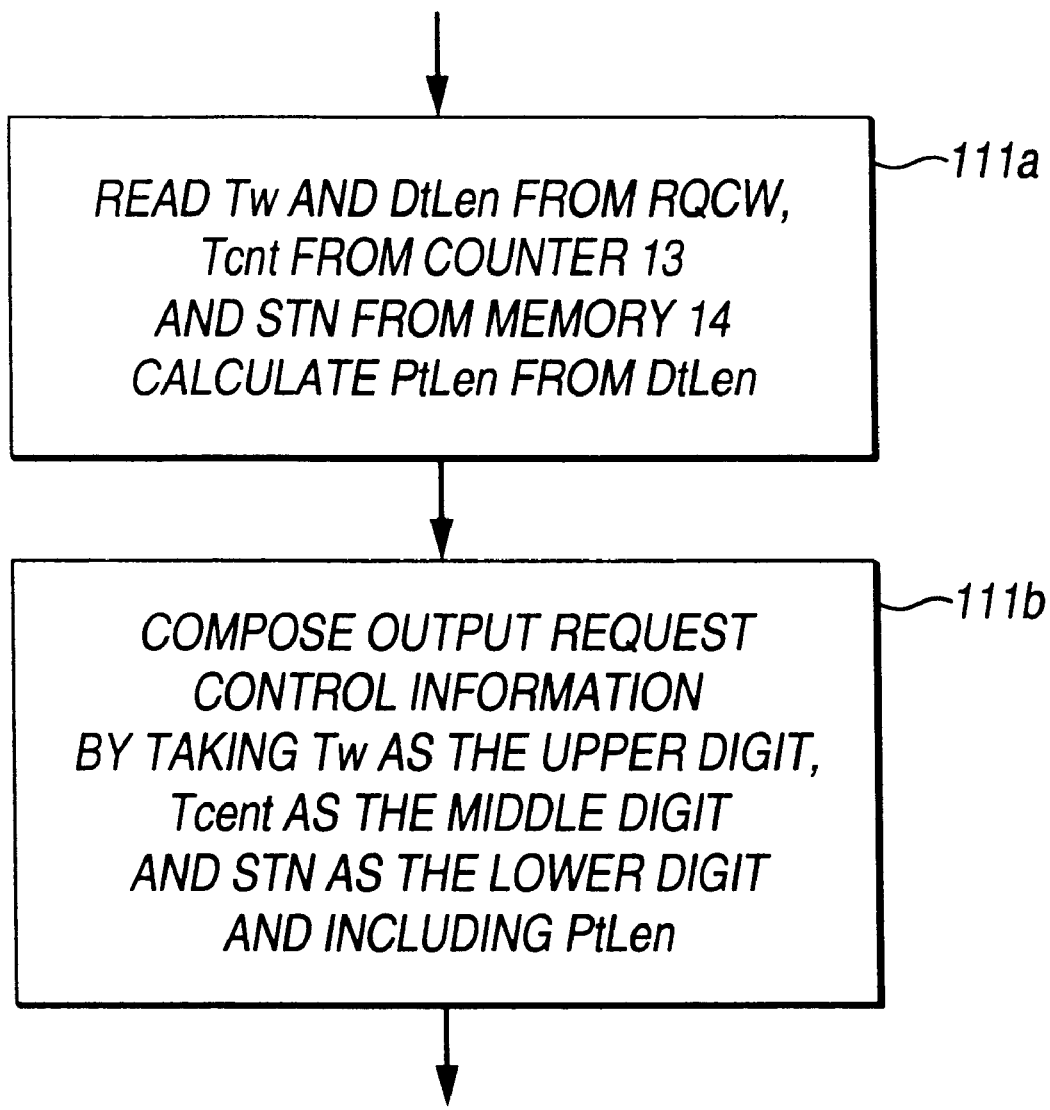
FIG. 3(a) is a processing procedure 111 which is executed by data stations.

The transfer request information (RQCW) includes the chain area, transfer data storage lead address, transfer address information, transfer completion limit time (Tw) and transfer data length (Dtlen) in a format such as illustrated in FIG. 11. Transmission control processing circuit 12 produces output request control information (TMCW) following processing sequence 111 in FIG. 3(a). That is to say, in Step 111a, it reads transfer completion limit time (Tw) and transfer data length (DtLen) from transfer request information (RQCW); it reads the count value (Tcnt) of counter circuit 13; reads the number (STN) inherent to the subject transmission station which is held in memory circuit 14, and computes a packet length (PtLen) based on data length (DtLen). In Step 111b, it produces a transfer completion time (Tcmp), taking transfer completion limit time (Tw) as the upper digit, count value (Tcnt) as the middle digit and the number (STN) inherent to the data station as the lower digit. Thus, it produces output request control information (TMCW) in a format such as that illustrated in FIG. 12(a), which includes a chain area, the transfer completion time (Tcmp) and the data packet length (PtLen).

The chain area stores addresses for sequentially linking multiple output request control informations (TMCW). This is for composing an output request queue (TMQUEU) for determining the order of output requests, and is composed by linking in quickest transfer completion limit time order.

It is managed by the output request queue control language illustrated in FIG. 13. The output request queue control language is composed to include the lead memory address (Top-PTR) of the output request control information (TMCW) which links to the head, the lead memory address (Bottom-PTR) of the output request control information (TMCW) which links to the final tail, and the number (RQ-cnt) of output request control informations (TMCW) which are chained (linked). Counter circuit 13 always counts a specified clock pulse. Its purpose is to stagger the transfer completion times (Tcmp) by the count value when the transfer completion limit times (Tw) of multiple transfer request informations (RQCW) are the same value. Also, different inherent numbers (for instance, a specific number in a series of numbers (STN-1, 2 . . . i)) are established beforehand for every hardware in the multiple transmission stations connected to the network.

Transmission control processing circuit 12 of a transmission station which functions as a data station (hereafter simply referred to as a "data station") sequentially reads the output request control information (TMCW) which are linked in the output request queue (TMQUEU) and compiles output request packets which include the addressee transmission station address, the transmission originator transmission station address, the transmission control discriminator (CNT) and the output request control information (TMCW) in a format such as that illustrated in FIG. 15(a). It then outputs this via transmission circuit 15 on the transmission path addressed to the transmission station which functions as the master station (hereafter simply referred to as the "master station"). In this case, code (CNT1) is established in the transmission control discriminators (CNT) to indicate a data output request packet.

The master station receives output request packets via reception circuit 16 and judges whether or not they are addressed to itself. If they are addressed to itself, it stores the received output request packets in memory circuit 14 and outputs a "reception completed" signal (Rsig). Reception control processing circuit 17 commences reception processing when the above signal (Rsig) has been outputted. It judges that it is an output request packet by referring to the transmission control discriminator (CNT1) in an output request packet stored in memory circuit 14 and confirms the lead memory address (TMCW-PTR) at which the transmission request control information (TMCW) in the output request packet received on this occasion is stored in memory circuit 14. Then, it links the above lead memory address to the output request queue (RQUEU) already maintained in memory circuit 14. This output request queue (RQUEU) is the output request control informations (TMCW) which have been transferred from all the data stations. It is composed in the same way as the previously-mentioned data station output request queue (TMQUEU), and is managed in the same output request queue control language (FIG. 13) as previously mentioned.

Reception control processing circuit 17 reads the transfer completion limit time (Tw) from the just received output request control information (TMCW). Using Top-PTR and Bottom-PTR of the output request queue control language, it executes a comparison of size relation by sequentially reading the same transfer completion limit times (Twj) from the output request control informations which are already linked. It then rearranges the linking order of the output request control informations (TMCW) so that they are in fastest transfer completion limit time first order. After it has re-composed the contents of the output request queue (RQUEU), it updates the contents of the output request queue control language (FIG. 13). In this case, when the transfer completion times (Tw) and count values (Tcnt) of output request control informations (TMCW) from multiple data stations are the same values, the link order of the output request queue (RQUEU) is determined in the ascending order of numbers inherent to data stations (STN-i).

Figure 3B:
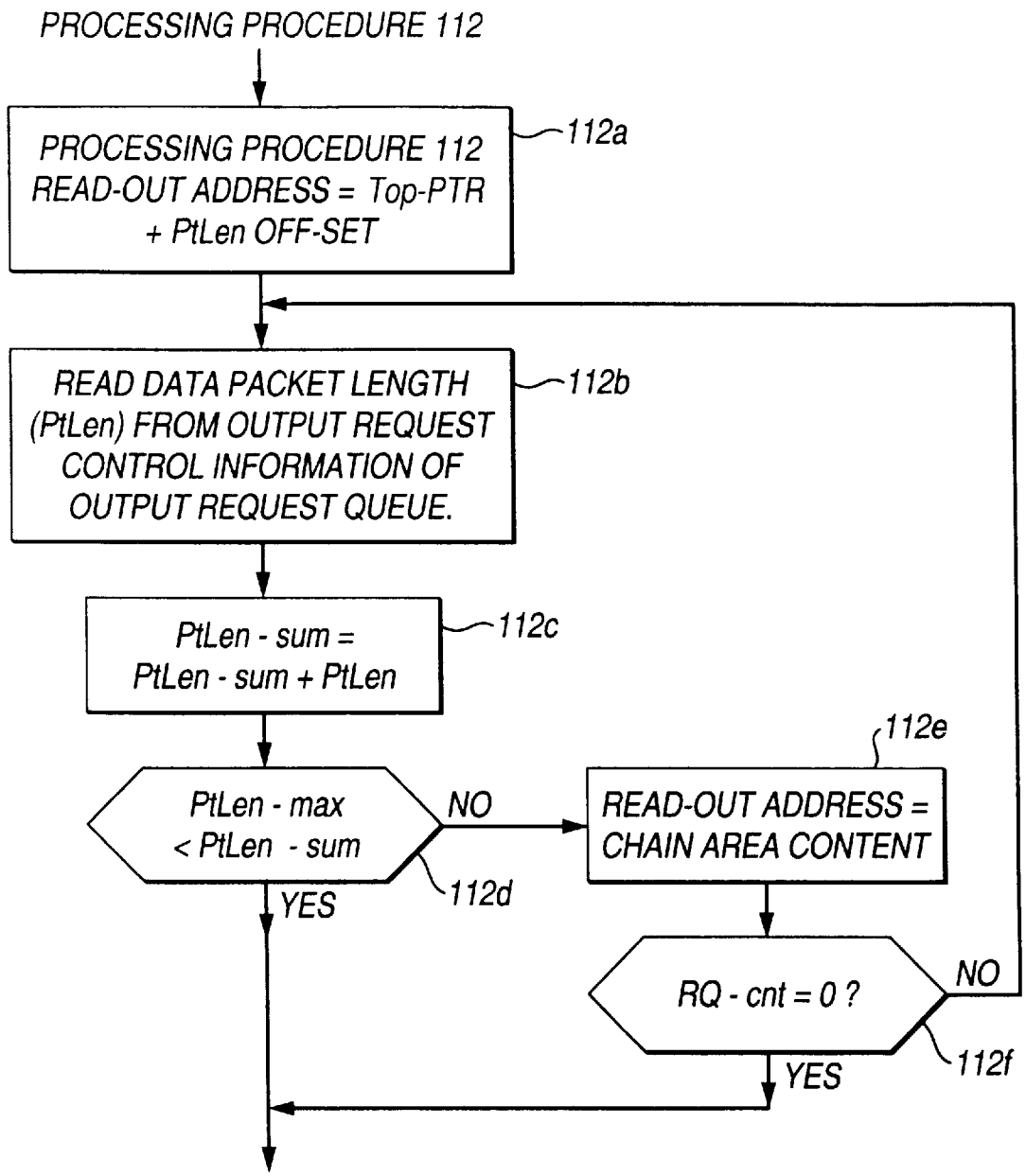
FIG. 3(b) is a processing procedure 112 which is executed by the master station.

When the transmission control processing circuit 12 receives a signal (RVsig) outputted from clock circuit 18, it executes processing procedure 112 in FIG. 3(b), composes an output permission packet and outputs it to the transmission path via transmission circuit 15. That is to say, in Step 112a, it sets the variable (PtLen-Sum) to 0 and reads Top-PTR and RQ-cnt from the output request control language. It determines the read-out address of data packet length (PtLen) which is included in the output request control information (TMCW) by computing the off-set address in Top-PTR, and sets RQ-cnt in a register. In Step 112b, it reads data packet length (PtLen) from output request control information (TMCW), which is stored in memory circuit 14, based on the above read-out address. In Step 112c, it updates the value of the variable (PtLen-sum) by adding the read out data packet length (PtLen) to the variable (PtLen-sum). In Step 112d, it compares updated variable (PtLen-sum) and pre-established output possible maximum data packet length (PtLen-max). When PtLen-sum<PtLen-max, it shifts to Step 112e, but when PtLen-sum>PtLen-max, processing ends. In Step 112e, it reads the contents of the chain area and the off-set address which are included in output request control information (TMCW), updates the address value, and subtracts 1 from the value of RQ-cnt which is set in the register. In Step 112f, it refers to the updated register value RQ-cnt, and, if it is not 0, it shifts to Step 112b, but if it is 0, processing ends.

Figure 14A:
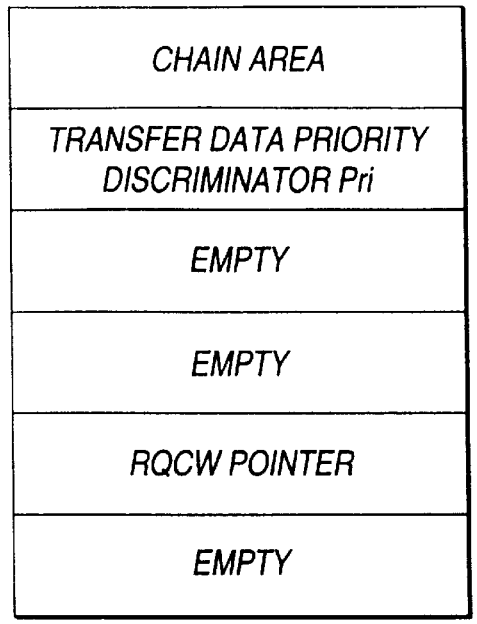
FIG. 14(a) is an example of the format of output permission information from the master station.

By this means, using output request control language, it sequentially reads output request control informations (TMCW) in fastest output completion limit time (Tw) order from the output request queue (RQUEU) maintained in memory circuit 14. It sequentially reads and adds the data packet lengths (PtLen) included in that, determines the number of output requests to which output permission is given within the range of the pre-established output possible maximum data packet length (PtLen-max) or less, and produces the output permission information illustrated in FIG. 14(a). It composes the output permission packets illustrated in FIG. 15(b), taking the data station numbers (STNo) included in the output request control informations (TMCW) as addressee data station addresses, and outputs them to the transmission path. In this case, CNT2 is established as the transfer control discriminator.

When using this embodiment, it becomes possible to schedule data which has a degree of urgency by making its transfer completion time the criterion.

Also, when control system 1 requests the transfer of data, it adds as an attribute to the transfer request information (RQCW) a transfer data priority discriminator (Pri) (FIG. 11 shows this case) which distinguishes between transfer time guaranteed data (hereafter referred to as simply "data (TC)") which guarantees being transferred within the transfer completion limit time (Tw) and transfer optimum data (hereafter referred to simply as "data (NTC)") which approves being transferred in the optimum state without guaranteeing always being transferred within the transfer completion limit time (Tw). The transfer requests for both data which has a strictness of transfer time and data which does not require such strictness can be scheduled every specified time interval (hereafter called "slot time") which is determined based on the control precision of the network application.

Figure 4:
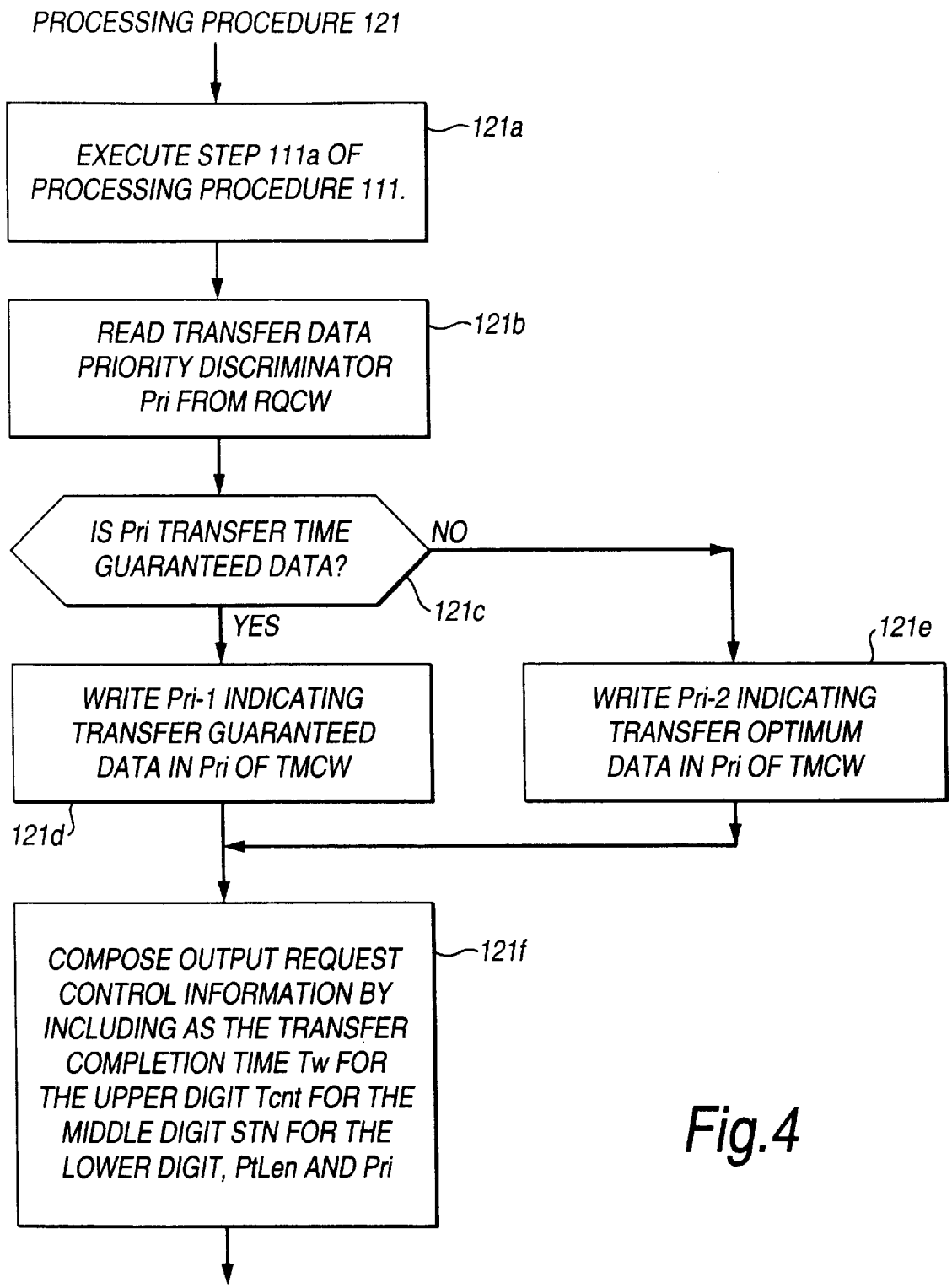
FIG. 4 is a processing procedure 121 which is executed by data stations.

In this case, when transmission control processing circuit 12 receives a "writing completed" signal (Isig) for the transfer request information )RQCW) from interface circuit 11, it executes processing procedure 121 in FIG. 4 and produces output request control information (TMCW). That is to say, in Step 112a, it executes the same processing as in Step 111a of FIG. 3(a); in Step 121b, it reads the transfer data priority discriminator (Pri) from the transfer request information (RQCW) and in Step 121c, it judges whether it is data (TC) or data (NTC) by referring to the transfer data priority discriminator (Pri). When it is data (TC), it writes Pri-1 as the transfer data priority discriminator of the output request control information (TMCW) in Step 121d, and when it is data (NTC), it writes Pri-2 in Step 121e. After that, in Step 121f, it executes the same processing as in Step 111b of FIG. 3(a). It produces output request control information (TMCW) which includes the chain area, the transfer data priority discriminator (Pri), the transfer completion time (Tcmp) and the data packet length (PtLen) (FIG. 12(a) shows this case), and writes it to memory circuit 14.

In this case, in memory circuit 14 of the data station side, output request queue (TMQUEU-1) for data (TC) and output request queue (TMQUEU-2) for data (NTC) are divided and provided by referring to transfer data priority discriminator (Pri), and they are compiled by linking respectively in quickest transfer completion time order. These output request queues are managed by respective output request languages of the same construction as the above-mentioned output request language (FIG. 13).

Transmission control processing circuit 12, in response to a timing signal given from the master station every slot time which is common with the transmission station and is determined based on the control accuracy of the network application, compiles output request packets (FIG. 15(a)) which include the output request control information (TMCW) and outputs them to the master station side, every timing signal (RQsig-1) given from reception control processing circuit 17.

In the memory circuit 14 of the master station also, an output request queue (RQUE-1) for data (TC) and an output request queue (RQUEU-2) for data (NTC) received from all transmission stations are divided and composed by referring to the transfer data priority discriminators (Pri). Every time an output request packet is received they are arranged in quickest transfer completion time order in the same way as previously mentioned. Then, the maximum data packet length (PtLen-max) which can be outputted in the slot time is determined beforehand, and output permission scheduling is executed for data (TC) in the same way as mentioned above every slot time.

When using this embodiment, it becomes possible to execute output permission scheduling for transfer requests every slot time.

Also, a specified value is set in the master station by a signal (SLsig) which is outputted from clock circuit 18 every slot time. The remaining time (TRmain) which was allocated to the output of data (TC) within a slot time is detected by the count value of asynchronous timer circuit 19 which is down-counted by the clock (CLKsig) which becomes the N times cycle of that signal (SLsig). The count value of asynchronous timer circuit 19 at the point in time at which the scheduling of data (TC) is completed is monitored as an asynchronous period.

Figure 14B:
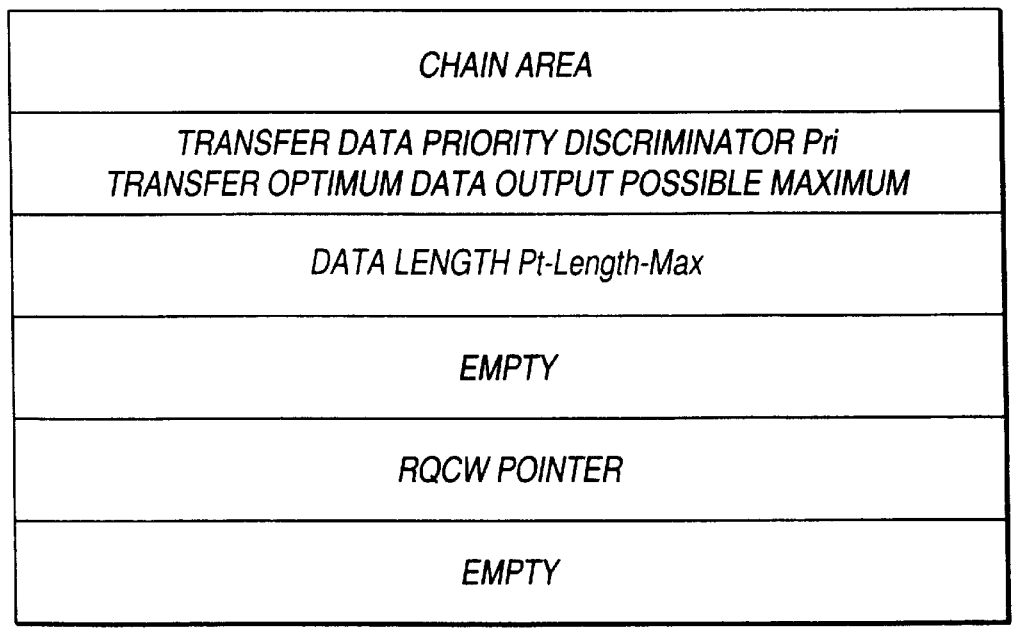
FIG. 14(b) is an example of the format of transfer optimum data output permission information from the master station.

Transmission control processing circuit 12 begins scheduling processing of data (NTC) from the point in time at which scheduling processing of data (TC) is completed. It reads data (Pb) and output possible maximum data packet length (PtLen-max2), which determine whether or not output of data (NTC) is possible, from a table (TBL-1), illustrated in FIG. 16(a), which is pre-established in memory circuit 14 based on the detected time remaining (TRmain). It reads the output request control information (TMCW) of data (NTC) which is linked in output request queue (RQUEU-2) in fastest transfer completion time order, and takes the maximum data packet length (PtLen-max) or less by the same procedure as in processing procedure 112 of FIG. 3(b). It determines the number of output requests of data (NTC) for which output is possible within the time remaining (TRmain), and makes the transmission station number (STNo), which is included in the output request control information (TMCW), to the addressee data station address. Then it composes output permission packets (FIG. 15(b)), which include output permission information (FIG. 14(b)), for data (NTC) for which transfer data priority discriminator (Pri-2) is established, and outputs them to the data stations to which output permission is given. In this case, PtLen-max2 is used as PtLen-max.

When using this embodiment, the execution of output permission scheduling becomes possible every slot time for output requests for both data (TC), which has strictness of transfer time, and data (NTC) which does not require such strictness.

Also, it can be designed so that scheduling of output permissions for output requests for data (NTC) is executed by both the data stations and the master station.

Figure 5:
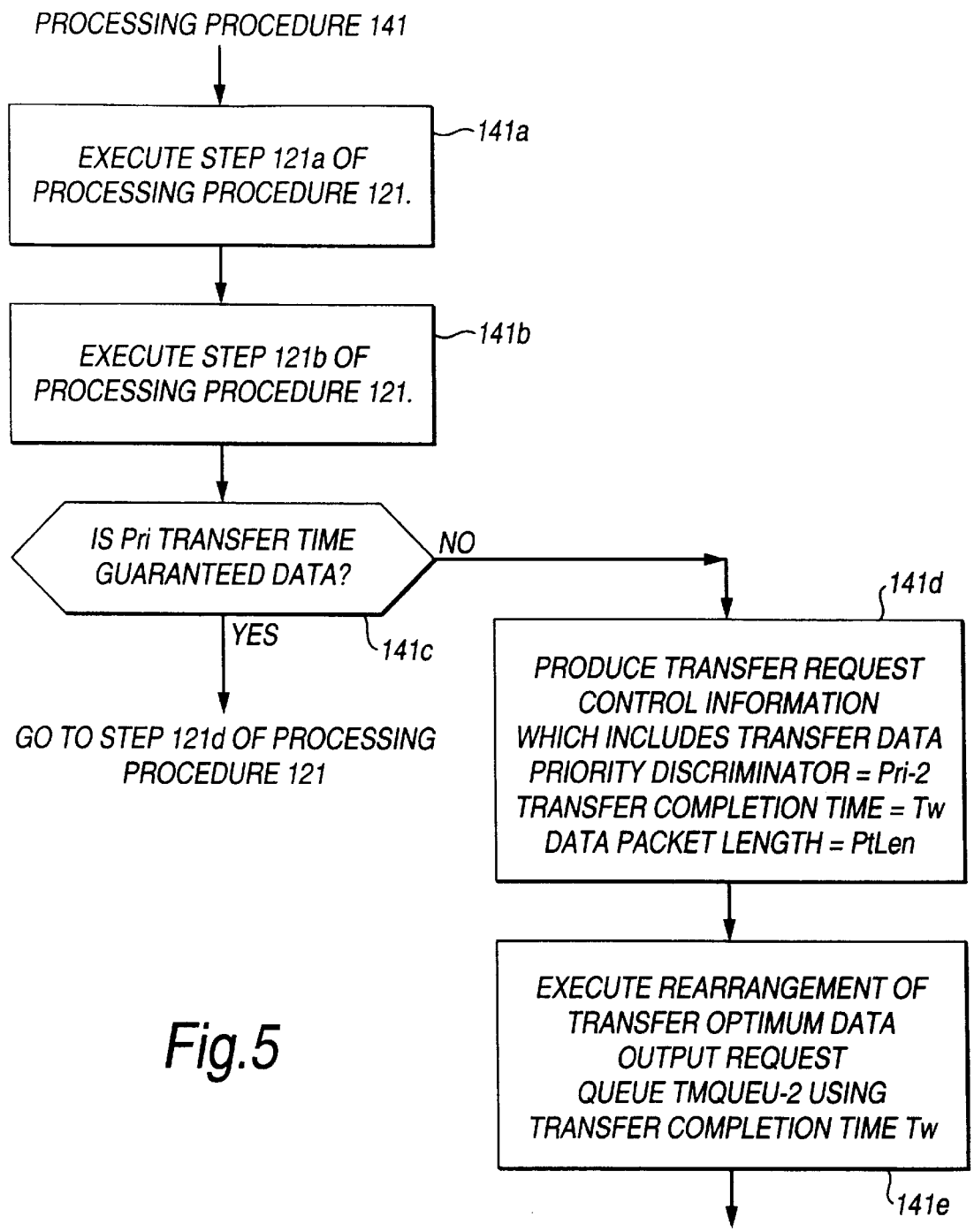
FIG. 5 is a processing procedure 141 which is executed by data stations.

In this case, when transmission control processing circuit 12 receives the "writing completed" signal (Isig) of transfer request information (RQCW) from interface circuit 11, it executes processing procedure 141 of FIG. 5. That is to say, In Steps 141a and 141b, it executes the same processing as in Steps 121a and 121b of FIG. 4. In Step 141c, it refers to the transfer data priority discriminator (Pri) and, when it is judged that it is data (TC), it executes the same processing as in Step 121f of FIG. 4. It produces output request control information (TMCW) by taking the transfer data priority discriminator as (Pri-1), and outputs an output request packet. Also, when it is judged that it is data (NTC), in Step 141d it produces output request control information (TMCW), taking the transfer data priority discriminator as (Pri-2), taking the transfer completion time as transfer completion limit time (Tw) and taking the data packet length found from the transfer data length (DtLen) as PtLen. In Step 141e, the link order of output request queue (TMQUEU-2) is rearranged in fastest transfer completion limit time (Tw) order, together with the output request control informations (TMCW) of incomplete outputs which are already linked in output request queue (TMQUEU-2). In this case, the elapsed times of the transfer completion limit times (Tw) of the output request control informations (TMCW) of incomplete output requests are reduced every slot time, and are compared by up-dating. In this embodiment, the output of output request packets of data (NTC) are not executed, and only the rearrangement of output request queue (TMQUEU-2) is executed.

Figure 6:
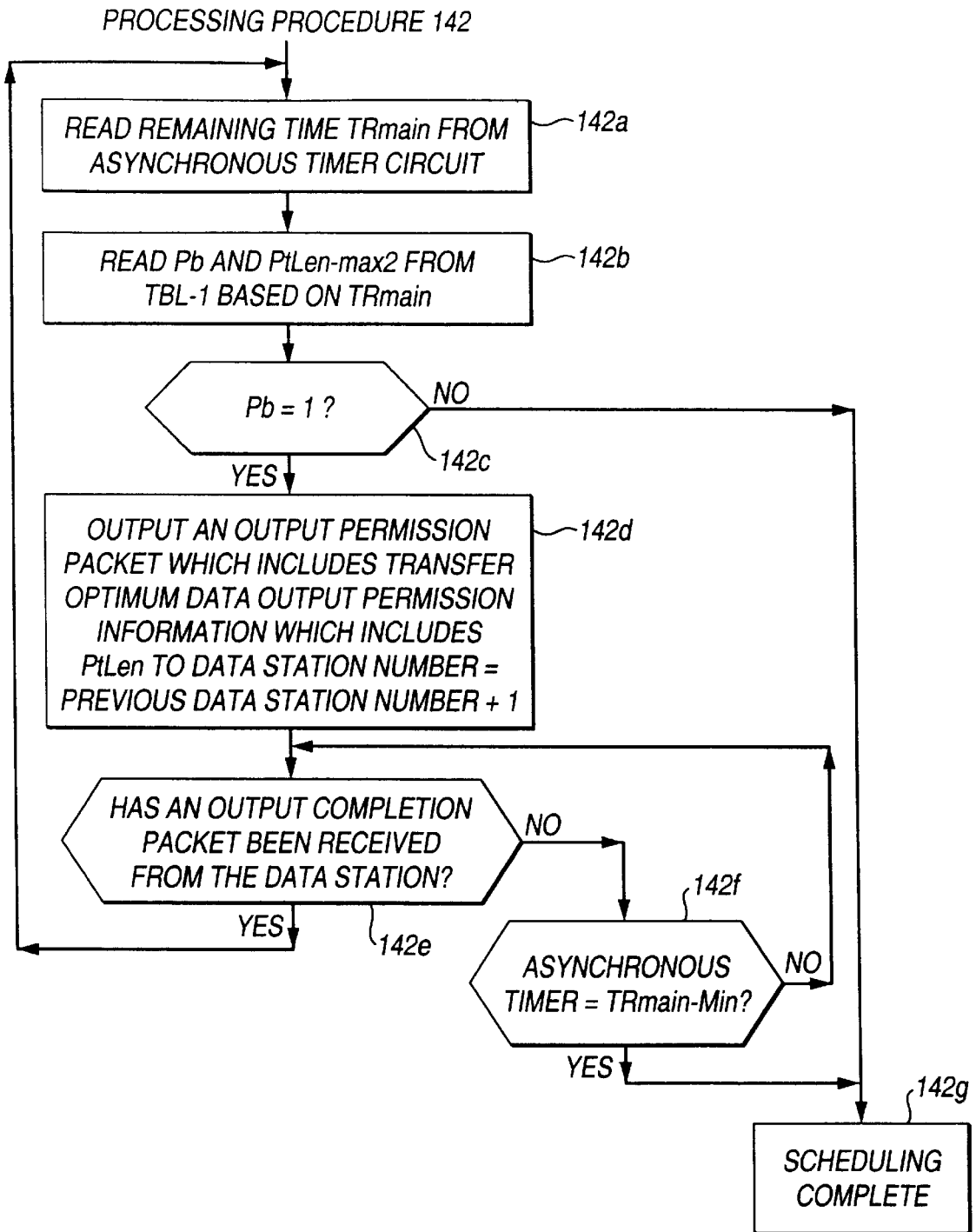
FIG. 6 is a processing procedure 142 which is executed by the master station.

When the master station receives an output request packet of data (TC), it executes the rearrangement of output request queue (TMQUEU-1) in the same way as mentioned above. It executes processing procedure 112 and executes scheduling for permitting outputs within the slot time in the same way as mentioned above. When the scheduling of data (TC) completes, it executes processing procedure 142 shown in FIG. 6, and commences scheduling for output requests for data (NTC).

That is to say, in Step 142a, it detects the time remaining (TRmain) within the slot time by reading the count value of asynchronous timer circuit 19. In Step 142b, it reads data (Pb) and PtLen-max2) from a table (TBL-1), illustrated in FIG. 16(a), based on the detected time remaining (TRmain), and checks whether (Pb) is 1 or 0 in Step 142b. When Pb=0, it judges that the output of transfer optimum data is not possible, and completes processing by causing the program to shift to Step 142g. When Pb=1, it judges that the output of data (NTC) is possible, and, in Step 142d, adds 1 to the data station numbers to which output permission has been given on this occasion. It sets PtLen-max2 as the data (NTC) output possible maximum data packet length (PtLen-max) for the next data station in the pre-established number order, and transfers the transfer optimum data output permission information illustrated in FIG. 14(b) to the data station. In Step 142e, the data station responds to the transfer optimum data output permission information and outputs data (NTC), and, until it outputs the output completion packet, it takes up the waiting state while monitoring time remaining (TRmain) in Step 142f. When the time remaining (TRmain) reduces to a specified value (TRmain-min), a signal (TRsig) is outputted from timer circuit 19, the program shifts to Step 142g, and processing is ended.

Figure 7:
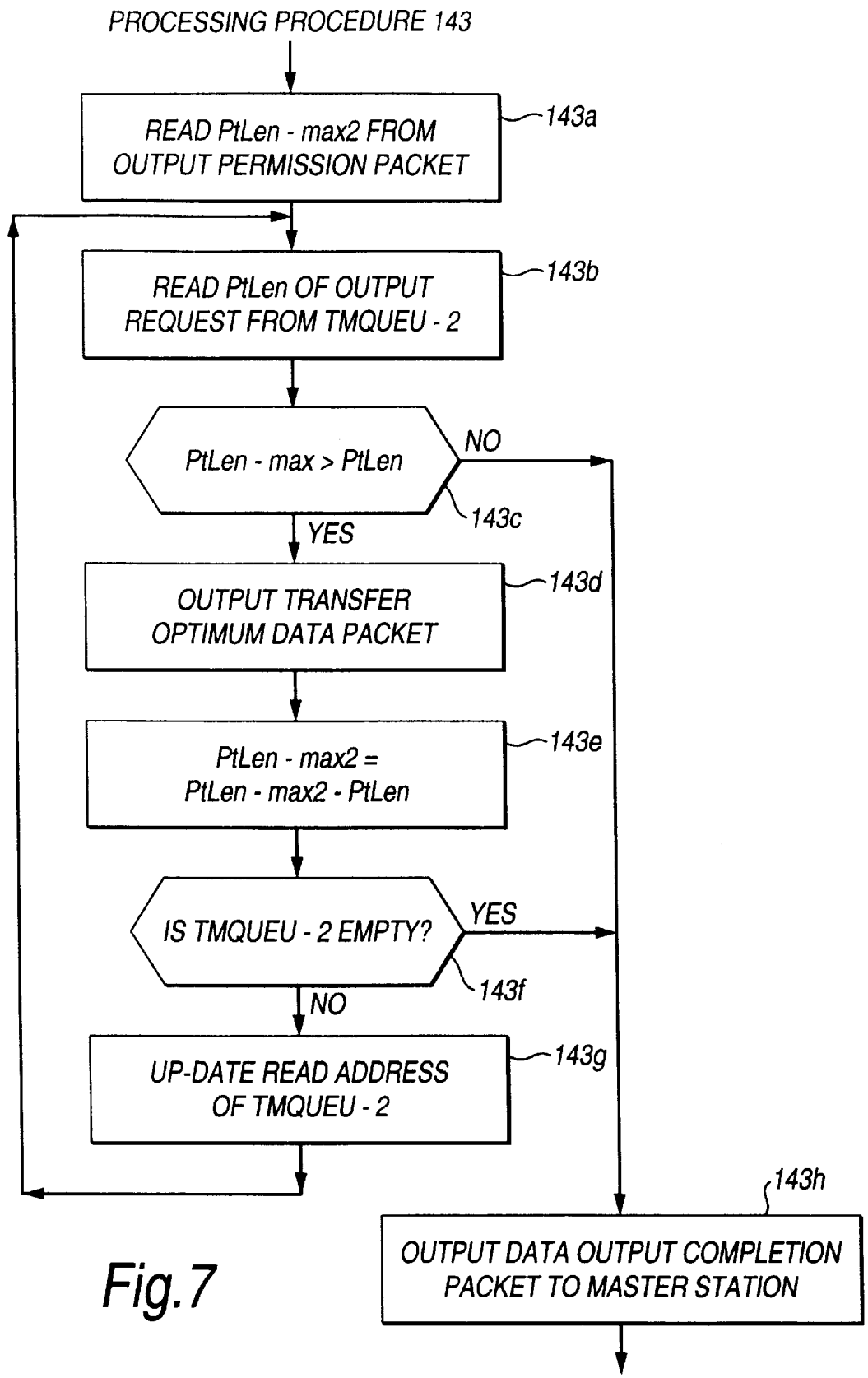
FIG. 7 is a processing procedure 143 which is executed by data stations.

Reception control processing circuit 17 of the data station which has received the transfer optimum data output permission information executes processing procedure 142 shown in FIG. 7. That is to say, in Step 143a, it reads the data (NTC) out possible maximum data packet length (PtLen-max2) from the transfer optimum data output permission information. In Step 143b, it reads the data packet length (PtLen) of the output request control information (TMCW) which is linked to the head of transfer request queue (TMQUEU-2). In Step 143c, it executes comparison of PtLen and PtLen-max2. When PtLen-max2>PtLen, it causes the program to shift to Step 143d, and when Ptlen-max2<PtLen, it causes the program to shift to Step 143h. In Step 143d, it outputs data (NTC) data packets. In Step 143e, it up-dates PtLen-max2 by computing PtLen-max2=PtLen-max2−PtLen. In Step 143f, it checks whether or not transfer request queue (TMQUEU-2) is empty. If it is not empty, it causes the program to shift to Step 143g, but if it is empty, it causes the program to shift to Step 143h. In Step 143g, it updates the address for reading the data packet length (PtLen) of the output request control information (TMCW) which was linked next in order in transfer request queue (TMQUEU-2), and returns to Step 143b. In Step 143h, it outputs to the master station an output completion packet for the transfer optimum data shown in FIG. 15(c) which indicates that the output of data (NTC) is completed. In this case, CNT3 is set as the transmission control discriminator.

In this way, after the master station has outputted an output permission packet for transfer optimum data to a data station, it sequentially executes scheduling for data (NTC) output requests until it is judged that output of data (NTC) is not possible within the asynchronous period.

When using this embodiment, in the case of transfer optimum data (NTC), output permission is given to data stations in an order pre-determined by the master station side without transfer request packets being outputted from the data stations, and it becomes possible to schedule as if the number of output requests for data (NTC) is determined by the data stations.

Furthermore, the volume of data (NTC) can be allocated for every data station by limiting the maximum data length of data (NTC) which it is possible to output to every transfer addressee data station.

Figure 8:
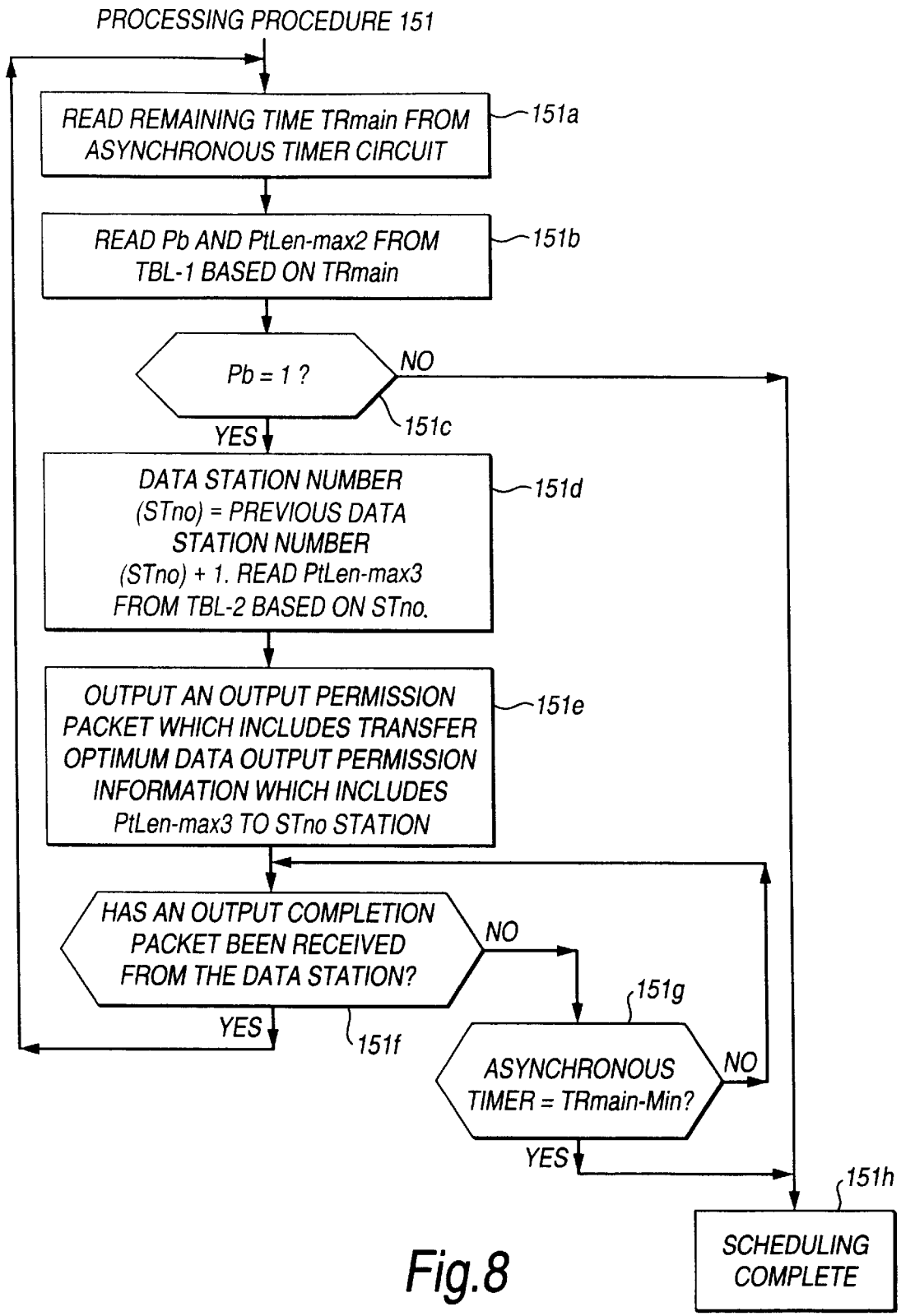
FIG. 8 is a processing procedure 151 which is executed by the master station.

In this case, when the scheduling of data (TC) is completed, the master station executes processing procedure 151 in FIG. 8 and commences scheduling for data (NTC) output requests. That is to say, in Steps 151a, 151b and 151c, it executes the same processing as in Steps 142a, 142b and 142c of FIG. 6. When the output of data (NTC) is judged possible, in Step 151d, it adds 1 to the data station numbers (STNo) to which output permission was given on the previous occasion, and reads the output possible maximum data packet length (PtLen-max3) which was pre-set for every data station number (STNo) from the table (TBL-2), illustrated in FIG. 16(b), based on this data station number (STNo). In Step 151e, it checks that PtLen-max3 is smaller than PtLen-max2, sets (PtLen-max3) as the transfer optimum data output permitted maximum data packet length (PtLen-max), and transfers transfer optimum data output permission information (FIG. 14(b)) to the data stations. In the case of PtLen-max3 being larger than PtLen-max2, it returns to Step 151a and repeats the same processing.

When using this embodiment, it becomes possible to limit the output data volume of transfer optimum data (NTC) for every data station.

The following are detailed descriptions of further embodiments of this invention.

With this invention, a transfer data priority discriminator (Pri) which distinguishes whether it is data (TC) or data (NTC) is added as an attribute to transfer request information (RQCW). When output request control information (TMCW) of data (TC) is transferred to the master station, the delay time until it is transferred to the transfer addressee transmission station can be executed by pre-consideration.

Figure 9:
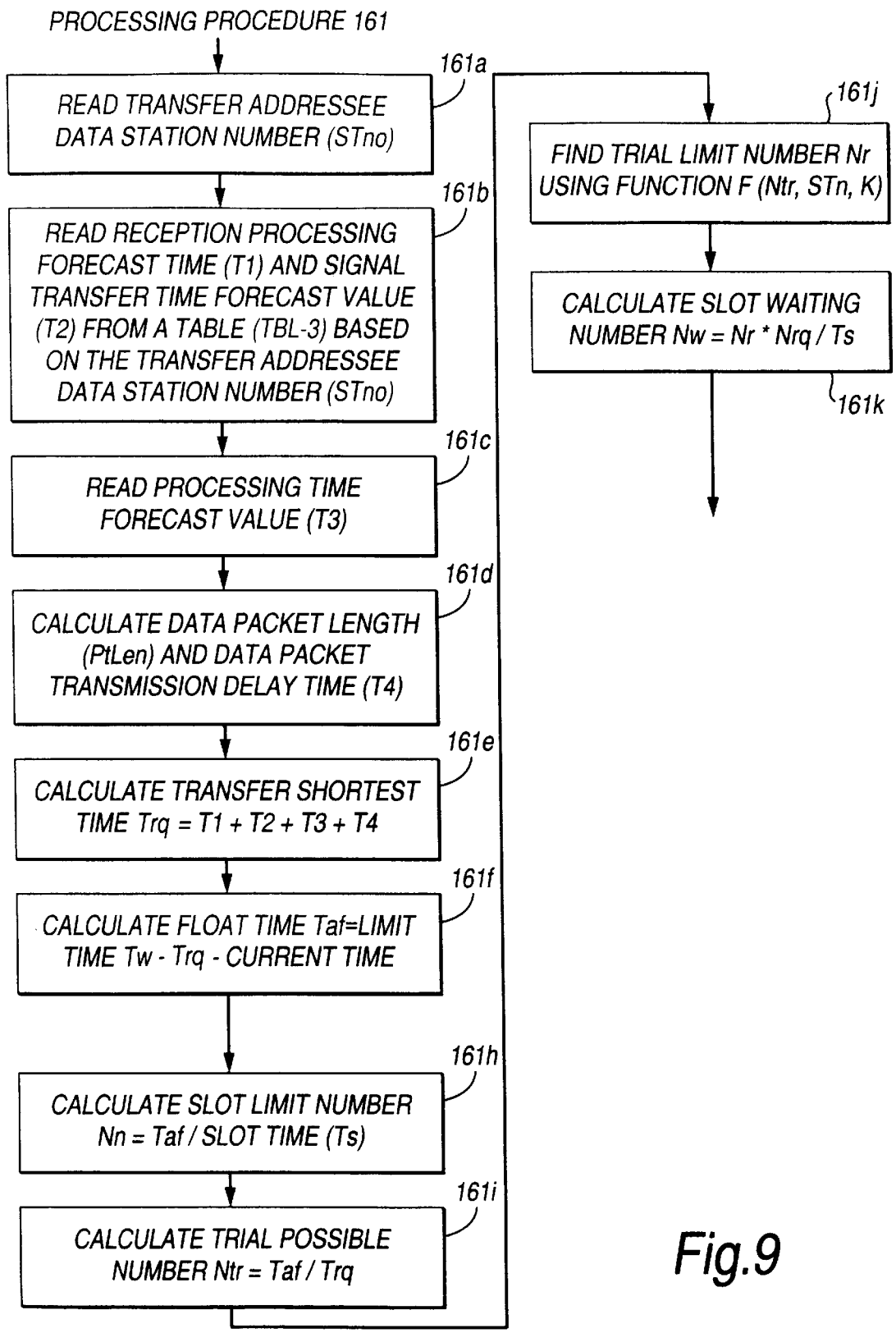
FIG. 9 is a processing procedure 161 which is executed by data stations.

In this case, when transmission control processing circuit 12 receives the "writing completed" signal (Isig) for the transfer request information (RQCW) from interface circuit 11, after it has executed Step 112f of processing procedure 121 in FIG. 4, it goes on to execute processing procedure 161 shown in FIG. 9, and executes rearrangement of transfer request queue (TMQUEU-1).

That is to say, in Step 161a, it reads the transfer data station number (STNo) from the transfer request information (RQCW). In Step 161b, it reads the reception processing time forecast value (T1) for the transfer addressee data station and the signal transmission time forecast value (T2) as far as the transfer addressee based on the above transfer addressee data station number (STNo) from the table (TBL-3) illustrated in FIG. 16(c). In this table (TBL-3), as illustrated in FIG. 16(c), (T1) and (T2) of every data station are pre-set and stored in memory circuit 14. In Step 161c, it reads the processing forecast time (T3) required for pre-set scheduling in memory circuit 14. In Step 161d, it calculates the data packet transmission delay time (T4) up to the time reception control processing circuit 17 of the transfer addressee data station receives the data packet, based on the data packet length (PtLen). In Step 161e, it calculates the transfer shortest time (Trq) by adding T1, T2, T3 and T4.

Figures 17, 18:
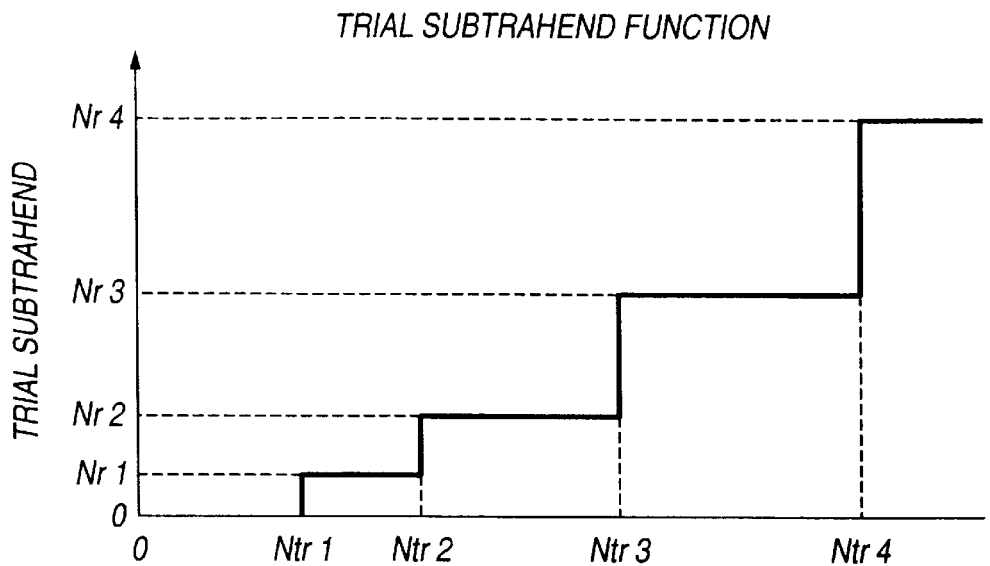
FIG. 17 is a trial subtrahend function used by data stations.
FIG. 18 is a reception data station information table (TBL-4) used by data stations.

In Step 161f, it calculates the float time (Taf) by subtracting the transfer shortest time (Trq) and the current time from the limit time (Tw). In Step 161h, it computes the slot limit number (Nm) by dividing float time (Taf) by the slot time (Ts). In Step 161i, it calculates the trial possible number (Ntr) by dividing float time (Taf) by the transfer shortest time (Trq). In Step 161j, it finds the trial subtrahend (Nr) from the trial subtrahend function (F (Ntr, STNo, K (constant))) based on the trial possible number (Ntr) and the transfer addressee data station (STNo). For this trial subtrahend function (F (Ntr, STNo, K (constant))), as illustrated in FIG. 17, a trial subtrahend (Nr-j) and a constant (K-j) are pre-set in memory circuit 14 for the trial possible number (Ntr-j) of every data station (STNo-j). The trial subtrahend (Nr-j) is set at a smaller value than the trial possible number (Ntr-j) in every special range of the trial possible number (Ntr-j).

In Step 161k, it calculates the slot waiting number (Nw) by multiplying the trial subtrahend (Nr) by the transfer shortest time (Trq) and then dividing by the slot time (Ts). This slot waiting number (Nw) becomes a smaller value than the slot limit number (Nm).

The slot waiting number (Nw) and slot limit number (Nm) found by the above means are added to the transfer request control information (TMCW). It re-forms the output request queue (TMQUEU-1) for transfer time guaranteed data (TC) by rearranging the transfer request control information (TMCW) on the criteria of whichever of the slot waiting number (Nw) and the slot limit number (Nm) is the smaller, together with the transfer request control information (TMCW) of incomplete outputs. For instance, when the slot limit number (Nm) is the smaller, it gives that priority, and if there is a smaller slot waiting number (Nw) than the slot limit number (Nm), it gives that priority. In the case of the slot limit number (Nm) and the slot waiting number (Nw) being the same value, it determines the link order by giving priority to the smaller data station number (STNo).

Furthermore, transmission control processing circuit 12 subtracts 1 from the slot waiting number (Nw) and the slot limit number (Nm) of the output request control information (TMCW) of the output request queue (TMQUEU-1) every slot time. It reads that output request control information (TMCW) when the slot waiting number (Nw) has become 0 or less, and outputs to the master station the output request packet which is included in that output request control information (TMCW) through timing signal (RQsig-1) which is assigned from reception control processing circuit 17 every slot time.

The master station reads the transfer completion times (Tcmp) and the data packet lengths (PtLen) from the received output request control information (TMCW). It determines the order given to output permissions based on the transfer completion times (Tcomp), and determines the number of output requests to which permission is given based on the data packet lengths (PtLen).

When using this embodiment, since the transmission delay time is taken into consideration and output request control information (TMCW) with a certain degree of float time is outputted, it becomes possible accurately to transfer data (TC) to the transfer addressee data station within the limit time.

Also, in the case of data (NTC), the data station transfers transfer request control information (TMCW) which includes the above-mentioned transfer completion time to the master station. The master station monitors the remaining time (TR-main) allocated to the output of data (TC) within the slot time as an asynchronous period. It determines the maximum data packet length (PtLen-max2) for which output of data (NTC) is possible within this asynchronous period; determines the number of data (NTC) output requests permitted based on the data packet lengths (PtLen) and the maximum data packet length (PtLen-max2) and can execute scheduling of output requests for data (NTC) in the same way as in the case of data (TC).

Also, in the case of data (NTC), the data station executes rearrangement of output request queue (TMQUEU-2) only, based on the limit time (Tw), but does not execute the output of transfer request control information (TMCW). The master station monitors the remaining time (TR-main) allocated to the output of data (TC) within the slot time as an asynchronous period, and transfers to the data station output permission information which includes the output possible maximum data packet length (PtLen-max2) by executing processing procedure 142 of FIG. 6. The data station which receives this output permission information can execute output of data (NTC) in a range of the output possible maximum data packet length (PtLen-max2) or less by sequentially reading data packet lengths (PtLen) from the transfer request control information (TMCW) which is linked to output request queue (TMQUEU-2).

Also, the master station monitors the remaining time (TR-main) as an asynchronous period, and transfers to the data station output permission information which includes the output possible maximum data packet length (PtLen-max3) for every transmission station by executing processing procedure 151 of FIG. 8. A data station which receives this output permission information executes output of data (NTC) in the range of the output possible maximum data packet length (PtLen-max3) for every transmission station by sequentially reading data packet lengths (PtLen) from the transfer request control information (TMCW) which is linked in output request queue (TMQUEU-2). It can allocate data (NTC) output amounts to every transmission station.

The following are detailed descriptions of further embodiments of this invention.

This invention, in the case of composing transfer request control information (TMCW) from transfer request information (RQCW), can compose it by using the slot limit number (Nm) and the slot waiting number (Nw) instead of the transfer completion time (Tcmp).

That is to say, in the case of data (TC), it finds the slot limit number (Nm) and the slot waiting number (Nw) in the same way as mentioned above by executing processing procedure 161 of FIG. 9. It composes the transfer request control information (TMCW), illustrated in FIG. 12(b), which includes the slot limit number (Nm) and the slot waiting number (Nw). Then, it re-forms it by determining in the same way as mentioned above the link order of output request queue (TMQUEU-1) based on the slot limit numbers (Nm) and the slot waiting numbers (Nw), and sequentially transfers the transfer request control information (TMCW) to the master station.

The master station reads the data station numbers (STNo), the slot waiting numbers (Nw), the slot limit numbers (Nm) and the data packet lengths (PtLen) from the received transfer request control information (TMCW). Then, it prioritizes the slot waiting numbers (Nw) and the slot limit numbers (Nm) by their smallness, and determines the order of giving output permission. For instance, when the slot limit number (Nm) is the smaller it gives priority to that, and when the slot waiting number (Nw) is smaller than the slot limit number (Nm), it gives priority to that. In the case of the slot limit number (Nm) and the slot waiting number (Nw) being the same, it determines the order of giving output permission by giving priority to the smaller of the output originator data station numbers or the transfer addressee transmission station numbers (STn-i or STNo).

When using this embodiment, it becomes possible to schedule data (TC) output requests every slot time, based on the slot waiting number (Nw) and the slot limit number (Nm) which take slot time (Ts) as a unit.

Also, in the case of data (NTC), the data station composes transfer request control information (TMCW) which includes the above-mentioned transfer completion times, and transfers it to the master station. The master station monitors the time remaining (TR-main) which was allocated to the output of data (TC) within the slot time as an asynchronous period. It determines the possible maximum data packet length (PtLen-max2) for the output of data (NTC) within this asynchronous period, and determines the order given to output permissions based on the transfer completion limit times (Tw). Then it can determine the number of output requests to which output permission is given based on the data packet lengths (PtLen) and the output possible maximum data packet length (PtLen-max2), and execute scheduling.

Also, in the case of data (NTC), the data station executes rearrangement of the output request queue (TMQUEU-2) based on the limit times (Tw), but does not execute the output of transfer request control information (TMCW). The master station monitors the time remaining (TR-main) which was allocated to the output of data (TC) within the slot time as an asynchronous period. It sequentially transfers to the data stations output permission information which includes the output possible maximum data packet length (PtLen-max2) by executing processing procedure 142 of FIG. 6. The data stations which receive this output permission information can execute the output of data (NTC) in a range of the output possible maximum data packet length (PtLen-max2) or less by sequentially reading data packet lengths (PtLen) from the transfer control information (TMCW) linked to output request queue (TMQUEU-2).

Also, the master station monitors the remaining time (TR-main) as an asynchronous period, and sequentially transmits to the data stations output permission information which includes an output possible maximum data packet length (PtLen-max3) for every transmission station by executing processing procedure 151 of FIG. 8. A data station which has received this output permission information can output in a range of the output possible maximum data packet length (PtLen-max3) for every transmission station by reading sequential data packet lengths (PtLen) from the transfer control information (TMCW) linked to the output request queue (TMQUEU-2), and can execute allocation of data (NTC) output amounts to every transmission station.

The following are detailed description of further embodiments of this invention.

This invention, in the case of executing the scheduling of output permissions for output requests every slot time, can permit output requests in excess of the slot time range by making a pre-set extended (expanded) time the limit when transfer requests which have a degree of urgency have accumulated.

Figure 10:
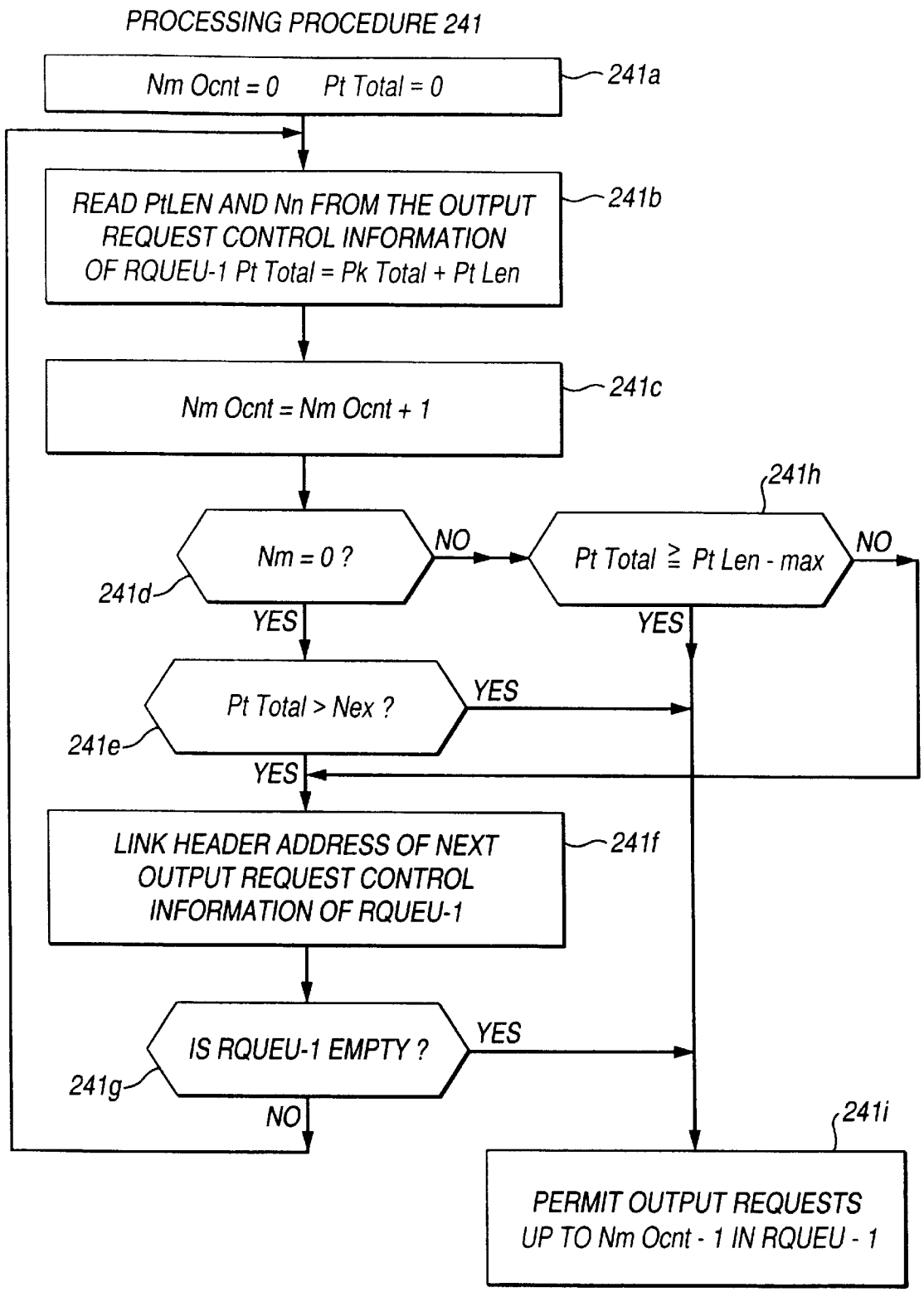
FIG. 10 is a processing procedure 241 which is executed by the master station.

In this case, when executing the scheduling of output permissions by reading the data (TC) transfer request control information (TMCW), the master station executes processing procedure 241 shown in FIG. 10.

That is to say, in Step 241a, it sets the variables (Nm0cnt) and (PtTotal) to 0. In Step 241b, it reads the data station number (STNo), the slot waiting number (Nw), the slot limit number (Nm) and the data packet length (PtLen) from the transfer request control information (TMCW) which is linked to transfer request queue (RQUEU-1), and up-dates the variable (PtTotal) by adding the data packet length (PtLen) to the variable (PtTotal). In Step 241c, it updates the variable (Nm0cnt) by adding 1 to the variable (Nm0cnt). In Step 241d, it judges whether the slot limit number (Nm) is 0 or not. If it is 0, it causes the program to shift to Step 241e, but if it is not 0, it causes the program to shift to Step 241h.

In Step 241e, it compares the variable (PtTotal) and the pre-set expanded output possible maximum data length (Nex). When PtTotal>Nex, it causes the program to shift to Step 241f, but when PtTotal<Nex, it causes the program to shift to Step 241i. In Step 241f, it reads the transfer request control information (TMCW) and updates the lead address. In Step 241g, it judges whether or not output request queue (RQUEU-1) is empty. If it is not empty, the program returns to Step 241b, but if it is empty, it causes the program to shift to Step 241i. In Step 241h, it compares the variable (PtTotal) and the output possible maximum data length (PtLen-max). When PtTotal≧PtLen-max, it causes the program to shift to Step 241i, and when PtTotal<PtLen-max, it causes the program to shift to Step 241f. In Step 241i, it determines output permission for output requests of output request control information (TMCW) which is linked in output request queue (RQUEU-1) of the rang in which 1 is subtracted from the variable (Nm0cnt).

By this means, with this embodiment, in the case of output requests for which the slot limit number (Nm) is 0 (output requests with a high degree of urgency without float time) accumulating and the maximum data length (PtLen-max) for which output is possible within the slot time being exceeded, a pre-set expanded output possible maximum data length (Nex) is taken as the limit, and it becomes possible to permit the output of data (TC) for which the slot limit number (Nm) is 0.

Incidentally, in this case, the synchronization of the slot time can be maintained by correcting the output possible maximum data packet length (PtLen-max) of the next slot time with a value which is a data packet length calculated value (Pt-sLt) equivalent to the slot time length subtracted from data (TC) output data total length (PtTotal).

Also, in the case of data (NTC), the data station composes transfer request control information (TMCW) which includes the above-mentioned transfer completion time and transmits this to the master station. The master station monitors the time remaining (TR-main) which was allocated to the output of data (TC) within the slot time as an asynchronous period. It determines the output possible maximum data packet length (PtLen-max2) for which output of data (NTC) is possible within this asynchronous period. Then it determines the number of output requests to which output permission is given, based on the data packet lengths (PtLen) and the output possible maximum data packet length (PtLen-max2). Thus it can execute scheduling of output permissions for data (NTC).

Also, in the case of data (NTC), the data station executes rearrangement of the output request queue (TMQUEU-2), based on the limit times (Tw), but does not execute the output of transfer request control information (TMCW). The master station monitors the remaining time (TR-main) which was allocated to the output of data (NTC) within the slot time as an asynchronous period. It transmits to sequential data stations output permission information which includes the output possible maximum data packet length (PtLen-max2) by executing processing procedure 142 in FIG. 6. The data stations which have received this output permission information can execute output of data (NTC) in the range of output possible maximum data packet length (PtLen-max2) by reading sequential data packet lengths (PtLen) from the transfer control information (TMCW) which was linked in output request queue (TMQUEU-2).

Also, the master station monitors the remaining time (TR-main) as an asynchronous period, and transfers to sequential data stations output permission information which includes the output possible maximum data packet length (PtLen-max3) of every transmission station by executing processing procedure 151 of FIG. 8. The data stations which have received this output permission information can execute the output of data (NTC) in the range of the output possible maximum data length (PtLen-max3) for every transmission station or less by reading sequential data packet lengths (PtLen) from the transfer control information (TMCW) linked in output request queue (TMQUEU-2), and can allocate output amounts of data (NTC) to every transmission station.

The following are detailed description of further embodiments of this invention.

With this invention, a station can judge whether or not data which the station, itself has transmitted has been received by the transfer addressee transmission station by sending data which discriminates packets sent by multiple transmission stations to each other.

The data stations execute output requests for data packets every slot time. The master station executes scheduling for the transfer requests of multiple data stations every slot time by operating in the manner described above. A data station which receives packets from a data station which has obtained output permission holds the packet identification information (RDId) and the received packet numbers (RDcnt) in memory circuit 14 every time it receives packets. That is to say, the table (TBL-4) illustrated in FIG. 18 is provided in memory circuit 14 of each data station, and an updated list is produced with the most recent packet identification information (RDId) and received packet number (RDcnt) for every transmission originator data station. Packet identification information is attached to every packet which each data station sends, for instance, consecutive numbers which are caused to be included within the packets can be used.

Also, the data stations execute output requests for data packets every slot time regardless of whether or not they have data packets to send. Moreover, when they execute output requests, they read the entire contents of (TBL-4) and transmit them to the master station and all the other data stations.

When using this embodiment, it becomes possible to check whether or not packets outputted every slot time have been received by the transfer addressee data station.

Incidentally, provided the systems are ones which execute output requests for data packets every slot time, this embodiment can also be applied to network systems other than the above-mentioned transmission control type.

Also, in the case of executing scheduling for output requests of data (TC) and data (NTC), this invention can be designed to cause execution of the above operation for data (TC) only.

In this case, the data stations receive data packets which have been outputted from data stations which have obtained output permission. They update the packet identification information (RDId) and received packet numbers (RDcnt) of every output originator data station every time they confirm it is data (TC) by referring to the transfer data priority discriminator (Pri), and produce received packet information lists (TBL-4). They execute output requests for data packets every slot time regardless of whether or not they have data packets to send. Furthermore, they output the contents of the received packet information list (TBL-4) to the master station and all the data stations.

When using this embodiment, in the case of outputting data (TC), it becomes possible to judge whether or not data (TC) data packets which were sent in the previous slot time have been received by the transfer addressee data stations.

The following is a detailed description of a further embodiment of this invention.

This embodiment specifically demonstrates the case of applying this invention to a bus type network system (FIG. 2(a)).

With this embodiment, in the case of executing scheduling for data (TC) and data (NTC) output requests every slot time, a reception period is provided within the slot time for receiving output requests.

That is to say, transmission control processing circuit 12 of the master station causes commencement of the processing of a reception period within the slot time when it has completed the processing of a synchronous period in which it causes the output of data (TC) from the data stations by outputting output permission information for data (TC). It outputs the output request enquiry packets illustrated in FIG. 15(d) which make enquiries to all data stations for fresh output requests for data (TC). In this case, the transmission control discriminator is set to CNT4.

When it receives an output request enquiry packet, each data station outputs a signal (RQSig-1) from reception control processing circuit 17. Transmission control processing circuit 12 reads output request control information (TMCW) from data (TC) output request queue (TMQUEU-1) and outputs output request packets to the master station.

Figures 19, 20:
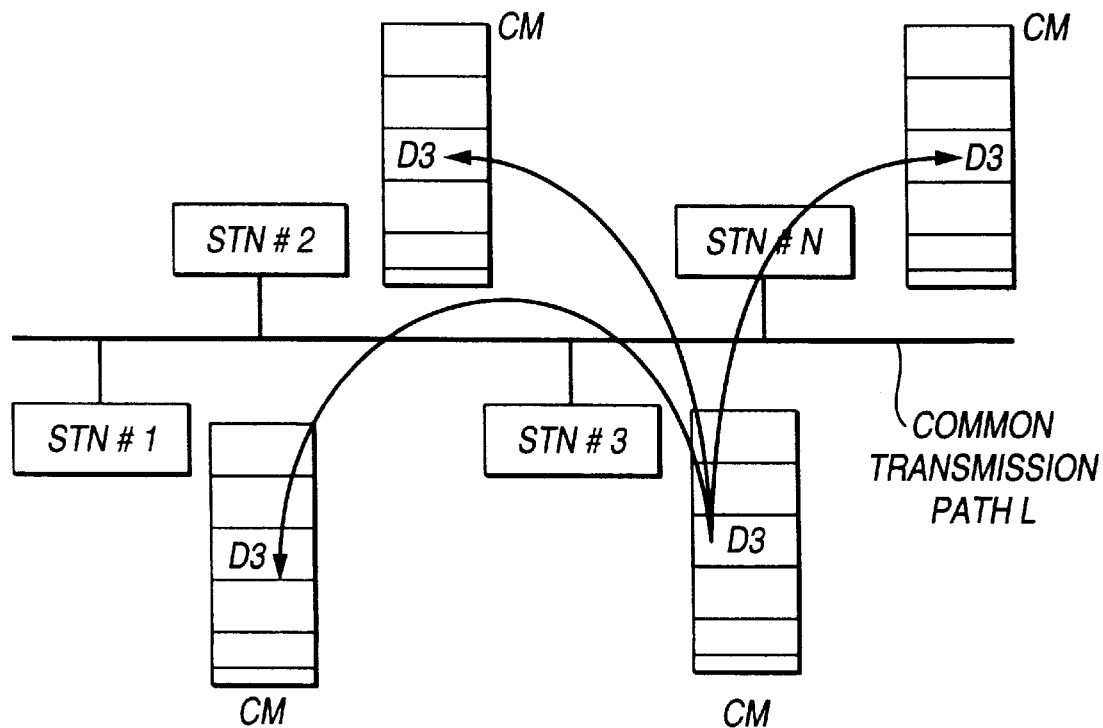
FIG. 19 is an output request search list (TBL-5) used by the master station.
FIG. 20 is an example of the composition of a prior art network system.

Also, the processing of an asynchronous period, which is formed by the time remaining when the synchronous period and the reception period are subtracted from the slot time, is carried out in succession. In the case of the output of data (NTC) being judged possible within this asynchronous period, transmission control processing circuit 12 of the master station commences the processing of a second reception period. It outputs output request enquiry packets (FIG. 15(d)) for data (NTC) to sequential data stations in accordance with the output request search list illustrated in FIG. 19 which is pre-set in memory circuit 14.

A data station which has received this data (NTC) output request enquiry packet outputs a signal (RQsig-2) from reception control processing circuit 17. Transmission control processing circuit 12 receives this and outputs a data (NTC) output request packet.

This embodiment can be applied to the other embodiments described previously.

When using this embodiment, by using a bus type network system, it becomes possible to schedule data (TC) and data (NTC) output requests from multiple data stations every slot time, The following is a detailed description of a further embodiment of this invention.

This embodiment specifically demonstrates the case of applying this invention to a star type network system (FIG. 2(b)).

With this embodiment, the transmission station which functions as the master station is positioned at the centre of a star type network. Full duplex communication is possible between it and each transmission station which functions as a data station. Therefore, in the case of the master station providing within the slot time a synchronous period in which the output of data (TC) from the data stations is caused by outputting output permission information for data (TC), a reception period in which it receives output requests from the data stations and an asynchronous period in which the output of data (NTC) from the data stations is caused, the asynchronous period can be provided in succession to the synchronous period, and the reception period can be provided in parallel with (at the same time as) the synchronous period and the asynchronous period.

Transmission control processing circuit 12 of the master station executes scheduling based on the output request control information (TMCW) of the data (TC) received in the reception period. It causes the output of data (TC) from sequential data stations by outputting data (TC) output permission information in the synchronous period.

Also, in the reception period, data (NTC) output requests can be received, and when the output of data (NTC) is judged possible in the asynchronous period, output request enquiry packets (FIG. 15(*d*)) for data (NTC) are composed in a pre-set data station order and outputted to the data stations. In a data station which has received this data (NTC) output request enquiry packet a signal (RQsig-2) is outputted from reception control processing circuit 17. Transmission control processing circuit 12 receives this, reads the output request control information (TMCW) from output request queue (TMQUEU-2), composes an output request packet and outputs it to the master station address.

It is possible to apply this embodiment to the other embodiments described previously.

When using this embodiment, by using a star type network system, it becomes possible to schedule data (TC) and data (NTC) output requests from multiple data stations every slot time.

When using the network system transmission control method of this invention, for data transfers requested in response to unexpectedly occurring events, the urgency of the data can be checked based on the limit time up to data transfer completion and, depending on the degree of urgency of data requested from the entire network, network resources concerned with data transfer processing can be allocated. For variations in the state of generation of data requests which varies from one moment to the next over the network as a whole, it becomes possible to complete data transfer within the required limit time.

It is possible to respond to both the requirements for control systems which are performed by existing network systems holding in common the fixed input/output data which they mainly handle, that is to say, the cyclic communications which are required to operate in cooperation by holding in common control state information, and the one-off message communications which are required by the respective function units even though they operate in cooperation by exchanging and holding in common information corresponding to events between application processes which operate autonomously. It also becomes possible to execute data transfer by a unified method.

In actual network application, as well as urgent data transfer requests which are strictly limited time-wise, there are also data transfer requests which may be transferred in the background. When using this invention, taking the former as transfer time guaranteed data (TC) and the latter as transfer optimum data (NTC), a transfer process becomes possible which mixes and schedules both.

With a general composition, it will become possible to execute the scheduling of data transfer requests by the same transmission control method for the bus type and star type network systems which will also be generally used in the future as networks in which multiple data stations mutually exchange data.

What is claimed is:

1. A network system transmission control method comprising the steps of:

assigning a limit time as an attribute for data for which transfer is requested;

generating, by a first data station, a transfer completion time by combining the limit time as a first value, a count value of a counter which measures a specified clock as a second value, and an inherent number of the data station as a third value;

transferring, by the first data station, first output request control information including the transfer completion time and a data packet length obtained from a data length to a master station;

determining, by the master station, an order for a plurality of output permissions for a plurality of output requests of a plurality of transmission stations based on the transfer completion time;

determining, by the master station, a number of the plurality of output requests to which the plurality of output permissions is given based on the data packet length; and scheduling, by the master station, the plurality of output permissions.

2. The method according to claim 1, wherein:

the step of assigning further comprises assigning a transfer data priority discriminator as an attribute for the data for which transfer is requested indicating whether the data comprises one of transfer time guaranteed data and transfer optimum data, the method further comprising the step of generating, by a second data station, the first output request control information including the transfer data priority discriminator, the step of transferring further comprises transferring the first output request control information to the master station every specified time interval which comprises slot and; and the step of scheduling further comprises scheduling the plurality of output permissions for a group of the plurality of output requests which include transfer time guaranteed data and transfer optimum data every slot time.

3. The method according to claim 2, further comprising the steps of:

determining, by the master station, a marshalling order of received first output request control information based on the transfer completion time;

monitoring, by the master station, remaining time allocated to the output of transfer time guaranteed data in one of the specified time intervals as an asynchronous period; and reading, by the master station, the transfer completion time and the data packet length of transfer optimum data from the first output request control information in the case of the output of transfer optimum data within the asynchronous period being judged to be possible.

4. The method according to claim 2, further comprising the steps of:

determining, by a second data station, an order of the first output request control information based on the transfer completion time;

transferring, by the second data station, only the first output request control information of the transfer time guaranteed data to the master station;

monitoring, by the master station, remaining time allocated to the output of transfer time guaranteed data within a specified time interval as an asynchronous period;

determining, by the mast station, a first maximum data length for the output of transfer optimum data within the asynchronous time;

outputting, by the master station, transfer optimum output permission information which includes the first maximum data length;

sequentially reading, by a third data station which receives the transfer optimum output permission information, the data packet length from the first output request control information of the transfer optimum data; and outputting transfer optimum data in a range of the first maximum data length or less.

5. The method according to claim 4, further comprising the steps of:

reading, by the master station, a second maximum data length for a transfer addressee data station number from predetermined lists including each transmission station if it is determined that the output of transfer optimum data is possible during the asynchronous time;

outputting, by the master station, transfer optimum data output permission information which includes the second maximum data length when the second maximum data length is less than the first maximum data length;

outputting, by a fourth data station which receives the transfer optimum output permission information, transfer optimum data in a range of the second maximum data length or less; and limiting the data length of the transfer optimum data outputted to every transfer addressee transmission station.

6. The method according to claim 1, further comprising the steps of:

assigning a transfer data priority discriminator as an attribute for data for which transfer is requested, wherein the data priority discriminator indicates whether the data is one of transfer time guaranteed data and transfer optimum data;

generating, by a second data station, the first output request control information including the transfer data priority discriminator;

seeking a slot waiting number and a slot limit number based on the limit time in the case of transfer time guaranteed data;

determining an order in which to arrange the first output request control information based on the slot waiting number and slot limit number;

sequentially transferring to the master station the first output request control information every specified time interval including slot time;

determining, by the master station, an order in which output permission is given based on the limit time; and scheduling every slot time.

7. The method according to claim 6, wherein, in the case of transfer optimum data, a third data station transfers the transfer request control information to the master station;

the master station determines a line-up order of the received first output request control information based on the transfer completion time, monitors remaining time allocated to the output of transfer time guaranteed data within a said specified time interval as an asynchronous period, and reads the transfer completion times and the data packet lengths of the transfer optimum data from the first output request control information in the case of the output of transfer optimum data being judged possible within the asynchronous period.

8. The method according to claim 6, wherein, in the case of transfer optimum data, a third data station determines a line-up order of the first output request control information based on the limit time but does not execute output of the first output request control information;

the master station monitors the remaining time allocated to output of transfer time guaranteed data within a specified time interval as an asynchronous period, determines a first output maximum data length for which output of transfer optimum data is possible within the asynchronous period, and transfers the transfer optimum data output permission information which includes the first maximum data length to data stations; and a fourth data station which receives the transfer optimum data output permission information sequentially reads the data packet length from the first output request control information of the transfer optimum data and outputs transfer optimum data in a range of the first output maximum data length or less.

9. The method according to claim 8, further comprising the steps of:

reading, by the master station, a second output maximum data length for the transfer addressee data station number from predetermined lists including every transmission station in the case of the output of transfer optimum data being judged possible within the asynchronous period;

outputting transfer optimum data output permission information including the second output maximum data length when the second output maximum data length is in a range of the first output maximum data length or less;

outputting, by a fifth data station which receives the transfer optimum data output permission information, transfer optimum data in a range of less than the second output maximum data length; and limiting the data length of the transfer optimum data which is outputted to every transfer addressee transmission station.

10. The method according to claim 1, wherein:

the step of assigning further comprises assigning a transfer data priority discriminator as an attribute of data for which transfer has been requested indicating whether the data comprises one of transfer time guaranteed data and transfer optimum data, and, when the data comprises transfer time guaranteed data, the method further comprises determining, by a second data station, a slot waiting number and a slot limit number based on the limit time;

generating, by the second data station, second output request control information which includes the transfer data priority discriminator, the slot waiting number and the slot limit number and the data packet corresponding to the data which is to be transferred;

transferring, by the second data station, the second output request control information to the master station in an order which is determined based on the slot waiting number and slot limit number every specified time interval including a slot time;

determining, by the master station, a number of output requests to which output permission is given based on the data packet length using the slot waiting number and the slot limit number instead of the transfer completion time; and scheduling every slot time.

11. The method according to claim 10, wherein, in the case of transfer optimum data, a third data station transfers the transfer request control information to the master station, and the master station determines a line-up order of the received output request control information based on the transfer completion time, monitors the remaining time allocated to the output of transfer time guaranteed data within a specified time interval as an asynchronous period, and reads the sequential transfer completion time and the data packet length form the output request control information in the case of the output of transfer optimum data being judged possible within the asynchronous period.

12. The method according to claim 10, wherein, in the case of transfer optimum data, a third data station determines a line-up order of the first and second output request control information based on the limit time, but does not execute output of the first and second output request control information; and the master station monitors the time remaining allocated to the output of transfer time guaranteed data within a specified time interval as an asynchronous period, determines a first output maximum data length for which transfer optimum data output is possible within the asynchronous period, and transfers transfer optimum data output permission information including the first output maximum data length at at least one data station; and a fourth data station which receives the transfer optimum data output permission information sequentially reads the data packet length from the output request control information of the transfer optimum data and outputs transfer optimum data in a range of the first output maximum data length or less.

13. The method according to claim 12, wherein, in the case of transfer optimum data, a fifth data station reads a second output maximum data length for the transfer addressee data station number from predetermined lists including every transmission station in the case of the output of transfer optimum data being judged possible within the asynchronous period and outputs transfer optimum data output permission information which includes the second output maximum data length when the second output maximum data length is in a range of the first output maximum data length or less; and a sixth data station which receives the transfer optimum data output permission information outputs transfer optimum data in a range of the second output maximum data length or less and limits the data length of the transfer optimum data which the sixth data station outputs to every transfer addressee transmission station.

14. The method according to claim 1, wherein:

the step of assigning further comprises assigning a transfer data priority discriminator as an attribute to the data for which transfer is requested indicating whether the data comprises one of transfer time guaranteed data and transfer optimum data and, in the case of transfer time guaranteed data, the method further comprises determining, by a second data station, a slot waiting number and a slot limit number based on the limit time;

generating, by the second data station, second output request control information which includes a data packet length corresponding to the slot waiting number, the slot limit number and the data length to be transferred; and transferring, by the second data station, the second output request control information to the master station in an order determined based on the slot waiting number and the slot limit number every specified time interval including slot time; and the master station determines the order of granting output permission based on the slot waiting number and slot limit number, determines the number of output requests to which output permission is given based on the data packet length and a predetermined extended output maximum data length, and permits output in excess of the slot time frame in the case of an accumulation of output requests for urgent transfer time guaranteed data.

15. The method according to claim 14, wherein, in the case of transfer optimum data, a third data station transfers the transfer request control information to the master station in the order determined based on the transfer completion times; and the master station determines a line-up order of the received output request control information based on the transfer completion times, monitors the remaining time allocated to the output of transfer time guaranteed data within a specified time interval as an asynchronous period, and reads the transfer completion time and the data packet length of the transfer optimum data from the output request control information in the case of output of transfer optimum data being judged possible within the asynchronous period.

16. The method according to claim 14, wherein, in the case of transfer optimum data, a third data station determines a line-up order of output request control information based on the limit time, but does not output the output request control information; and the master station monitors the remaining time allocated to the output of transfer time guaranteed data within a specified time interval as an asynchronous period, determines a first output maximum data length for which transfer optimum data output is possible within the asynchronous period, and transfers transfer optimum data output permission information which includes the first output maximum data length to the data stations, and a fourth data station which receives the transfer optimum data output permission information, sequentially, reads the data packet length from the transfer optimum data output request control information and outputs transfer optimum data in a range of the first output maximum data length or less.

17. The method according to claim 16, wherein, in the case of transfer optimum data, a fifth data station reads a second output maximum data length for the transfer addressee data station number from predetermined lists including every transmission station in the case of the output of transfer optimum data being judged possible within the asynchronous period, and outputs transfer optimum data output permission information which includes the second output maximum data length when the second output maximum data length is in the range of the first output maximum data length or less, and a sixth data station which receives the transfer optimum data output permission information outputs transfer optimum data in a range of the second output maximum data length or less, and limits the data length of the transfer optimum data which the sixth data station outputs to every transfer addressee transmission station.

18. A network system transmission control method comprising the steps of:

executing, by a first data station, output requests for data packets every specified time interval;

granting, by a master station, output permission by executing scheduling for the output requests every specified time interval; and, in the case of multiple transmission stations mutually exchanging data, generating, by a second data station, a received packet information list by updating packet discrimination information and received packet numbers for every output originator data station every time the second data station receives a data packet from an other data station which has obtained the output permission;

transferring, by the second data station, the contents of the received packet information list to the master station and all other data stations when executing output requests for data packets every said specified time interval regardless of whether or not there is an output data packet, and enabling judgement of whether or not an outputted data packet has been received by the transfer addressee data station.

19. In the network system transmission control method according to claim 18, a network system transmission control method which adopts the network system transmission control method stated in any of claims 2, 6, 10 or 14, wherein the step of enabling further comprises:

enabling judgement of whether or not a data packet of transfer time guaranteed data which an output addressee data station has outputted has been received by the transfer addressee data station.

20. The method according to any of claims 4, 5, 8, 9, 12, 13, 16, or 17, further comprising:

providing, by the master station, within the specified time, a synchronous period to cause the execution of the output of transfer time guaranteed data, a reception period in which output requests for transfer time guaranteed data are received, and an asynchronous period comprising the remaining time after the synchronous period and the reception period are subtracted from the specified time;

causing, by the master station, the output of transfer time guaranteed data from the data station in the specified time by outputting output permission information for the transfer time guaranteed data based on the output request control information received up to that point;

causing, by the master station, the output of output request control information from a transmitting data station in the reception period by outputting enquiry packets which urge output requests for transfer time guaranteed data;

causing, by the master station, the output of output request control information from each data station by outputting enquiry packets which urge output requests for transfer optimum data sequentially to each data station in a predetermined output request search list, in the case of the output of transfer optimum data being judged possible within the asynchronous period causing, by the master station, the output of transfer optimum data from each data station by outputting output permission information for transfer optimum data; and scheduling, by the master station, output permission to output requests for transfer time guaranteed data and transfer optimum data every slot time for multiple transmission stations using a bus type network.

21. The method according to any of claims 4, 5, 8, 9, 12, 13, 16, or 17, wherein the master station and a plurality of data stations are connected by full duplex communication star-type transmission paths and the master station has, within the specified time, a synchronous period in which the master station causes the execution of the output of transfer time guaranteed data, an asynchronous period comprising the remaining time when the synchronous period is subtracted from the specified period, and a reception period in which the master station receives output requests for transfer time guaranteed data and transfer optimum data by operating the synchronous period and the asynchronous period in parallel, the method further comprising causing, by the master station, the output of transfer time guaranteed data from data stations by outputting output permission information for transfer time guaranteed data in the synchronous period;

causing, by the master station, the output of transfer optimum data from data stations by outputting output permission information for transfer optimum data in the case of the output of transfer optimum data being judged possible in the asynchronous period and scheduling, by the mast station, output permissions for the transfer time guaranteed data and transfer optimum data output requests of multiple transmission stations, every slot time, using the star-type network.

22. The method according to any of claims 6, 10 or 14, further comprising:

computing, by a third data station, float time (Taf) by subtracting current time and the transfer minimum time (Trq), which is predetermined for every transfer addressee data station, from the limit time;

computing, by the third data station, a slot limit number (Nm) by dividing the s float time (Taf) by the slot time (Ts);

computing, by the third data station, a trial possible number (Ntr) by dividing the float time (Taf) by the transfer minimum time (Trq);

computing, by the third data station, a trial subtrahend (Nr) based on a function (f(Ntr, STNo, K (constant))) predetermined for every transfer addressee data station (STNo); and computing, by the third data station, a slot waiting number (Nw) by multiplying the transfer minimum time (Trq) by the trial subtrahend (Nr) and dividing by the slot time (Ts).

23. The method according to claim 22, further comprising:

reading, by a seventh data station, a transfer addressee data station reception processing time forecast value (T1) and a signal transfer time forecast value as far as the transfer addressee (T2) based on a transfer addressee data station number (STNo) assigned to the data for which transfer is requested from a predetermined list (TBL-1) which includes every transfer addressee data station number;

reading, by the seventh data station, a processing time forecast value (T3) required by the predetermined scheduling;

computing, by the seventh data station, a data packet delay time (T4) as far as the reception of the data packet by the transfer addressee data station based on the data packet length to be transferred, and determining, by the seventh data station, a transfer minimum time (Trq) by adding together the T1, T2, T3 and T4.

24. The method according to claim 22, further comprising:

subtracting, by a seventh data station, 1 from the slot waiting number and the slot limit number which were added to the transfer request control information of an output which is not complete every said specified time interval;

arranging, by the seventh data station, the transfer request control information in an order determined based on the slot waiting number and slot limit number every time a transfer is requested, and transferring, by the seventh data station, to the master station transfer request control information for which the slot waiting number becomes 0 or less.

* * * * *